(12) United States Patent
Usui

(10) Patent No.: US 9,418,048 B2
(45) Date of Patent: Aug. 16, 2016

(54) APPARATUS AND METHOD FOR ALLOCATING SHARED STORAGE AREAS TO PARALLEL PROCESSORS FOR MULTIPLICATION OF SPARSE MATRIX AND VECTOR

(71) Applicant: FUJITSU LIMITED, Kawasaki-shi, Kanagawa (JP)

(72) Inventor: Tetsuzou Usui, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 116 days.

(21) Appl. No.: 14/190,623

(22) Filed: Feb. 26, 2014

(65) Prior Publication Data

US 2014/0298351 A1    Oct. 2, 2014

(30) Foreign Application Priority Data

Mar. 29, 2013  (JP) ................................. 2013-074443

(51) Int. Cl.
  *G06F 9/46*  (2006.01)
  *G06F 17/16*  (2006.01)

(52) U.S. Cl.
  CPC ...................................... *G06F 17/16* (2013.01)

(58) Field of Classification Search
  USPC ........................................................ 718/107
  See application file for complete search history.

(56) References Cited

U.S. PATENT DOCUMENTS

| | | | |
|---|---|---|---|
| 2007/0198621 A1* | 8/2007 | Lumsdaine et al. .......... | 708/200 |
| 2009/0171636 A1 | 7/2009 | Shimizu | |
| 2010/0241683 A1 | 9/2010 | Nakanishi | |
| 2011/0191761 A1* | 8/2011 | Doyle et al. ................... | 717/156 |
| 2011/0307685 A1* | 12/2011 | Song ............................... | 712/16 |
| 2012/0078991 A1 | 3/2012 | Nakanishi | |

FOREIGN PATENT DOCUMENTS

| | | |
|---|---|---|
| JP | 2001-209631 | 8/2001 |
| JP | 2009-199430 | 9/2009 |
| JP | 2010-224682 | 10/2010 |
| JP | 2012-73681 | 4/2012 |
| WO | WO 2008/026261 A1 | 3/2008 |

OTHER PUBLICATIONS

Patent Abstracts of Japan, Publication No. 2009-199430, Published Mar. 3, 2009.
Patent Abstracts of Japan, Publication No. 2010-224682, Published Oct. 7, 2010.
Patent Abstracts of Japan, Publication No. 2012-73681, Published Apr. 12, 2012.

(Continued)

*Primary Examiner* — Hang Pan
(74) *Attorney, Agent, or Firm* — Staas & Halsey LLP

(57) ABSTRACT

An information processing apparatus assigns the calculation of a first submatrix included in a matrix including zero elements and non-zero elements to a first thread and the calculation of a second submatrix included in the matrix to a second thread. The information processing apparatus compares the distribution of non-zero elements in the rows or columns of the first submatrix with the distribution of non-zero elements in the rows or columns of the second submatrix. The information processing apparatus determines allocation of storage areas for storing vectors to be respectively used in the calculations by the first and second threads, according to the result of the comparison.

6 Claims, 18 Drawing Sheets

(56) References Cited

OTHER PUBLICATIONS

Patent Abstracts of Japan, Publication No. 2001-209631, Published Aug. 8, 2001.

Kotakemori et al., "Performance Evaluation of a Parallel Iterative Method Library using OpenMP", Numerical Analysis Symposium 2005, Jun. 28-30, 2005, 4 pages. With English Abstract.

Takahiro Katagiri, "Development of Auto-tuning Facility for Sparse Matrix Iterative Libraries", Workshop of Research Institute for Mathematical Sciences: Mathematical foundation and development of algorithms for scientific computing, Oct. 18-21, 2010, 126 pages. With partial English translation of p. 105.

Hiroto Tadano, "Parallel Numerical Algorithm I", CCS(Center of Computation Sciences) HPC(High Performance Computing) Summer Seminar 2010, Jul. 8-9, 2010, 50 pages. With partial English translation of pp. 16-22.

Barrett et al., "Templates for the Solution of Linear Systems: Building Blocks for Iterative Methods", pp. 1-118, noting particularly pp. 57-60, 1994.

S. Williams, L. Oliker, R. Vuduc, J. Shalf, K. Yelick, J. Demmel, "Optimization of sparse matrix-vector multiplication on emerging multicore platforms", Parallel Computing 35, Elsevier, 2009, pp. 178-194.

\* cited by examiner $$\text{SYMMETRIC SPARSE MATRIX} \begin{pmatrix} 4.0 & 9.0 & 0 & 3.0 & 0 & 0 \\ 9.0 & 11.0 & 5.0 & 0 & 0 & 0 \\ 0 & 5.0 & 6.0 & 0 & 0 & 0 \\ 3.0 & 0 & 0 & 1.0 & 8.0 & 12.0 \\ 0 & 0 & 0 & 8.0 & 2.0 & 10.0 \\ 0 & 0 & 0 & 12.0 & 10.0 & 7.0 \end{pmatrix} \begin{pmatrix} \text{INPUT} \\ \text{VECTOR} \\ 0.1 \\ 0.2 \\ 0.3 \\ 0.4 \\ 0.5 \\ 0.6 \end{pmatrix} = \begin{pmatrix} \text{RESULTING} \\ \text{VECTOR} \\ 3.4 \\ 4.6 \\ 2.8 \\ 11.9 \\ 10.2 \\ 14.0 \end{pmatrix}$$

FIG. 3

APPARATUS AND METHOD FOR ALLOCATING SHARED STORAGE AREAS TO PARALLEL PROCESSORS FOR MULTIPLICATION OF SPARSE MATRIX AND VECTOR

CROSS-REFERENCE TO RELATED APPLICATION

This application is based upon and claims the benefit of priority of the prior Japanese Patent Application No. 2013-074443, filed on Mar. 29, 2013, the entire contents of which are incorporated herein by reference.

FIELD

The embodiments discussed herein relate to a parallel operation method and an information processing apparatus.

BACKGROUND

Large-scale numerical calculations such as scientific calculations may be carried out using supercomputers or other high performance computers. Such large-scale numerical calculations often involve high-dimensional matrix operations. For example, in the flow analysis field, structural analysis field, and other fields, large-scale simultaneous equations may be solved using a coefficient matrix that represents the coefficients of the simultaneous equations. Another example is that, in the circuit analysis field, vibration analysis field, and other fields, the eigenvalues of a large-scale matrix may be computed. In a matrix operation using a computer, an approximate solution may be computed by iterations of matrix-vector multiplication. For example, an approximate solution of a differential equation, which is analytically difficult to solve, may be computed by iterations of multiplying a coefficient matrix by a vector with the finite element method.

A matrix to be used in a large-scale numerical calculation may be a sparse matrix with a high percentage of zero-valued elements (zero elements) and a small percentage of non-zero-valued elements (non-zero elements). Sparse matrix representation including zero elements based on the matrix structure produces a large amount of data and therefore is inefficient. To deal with this, there are compressed storage formats for representing a sparse matrix as compressed data without zero elements. Such compressed storage formats include Compressed Column Storage (CCS) format and Compressed Row Storage (CRS) format.

In the compressed column storage format, the elements included in an N×M matrix are searched in column-major order (i.e., in the order of row 1 and column 1, row 2 and column 1, ..., row N and column 1, row 1 and column 2, row 2 and column 2, ..., row 1 and column M, ..., and row N and column M), and only the non-zero elements are extracted from the matrix. Then, a first array that holds the values of the non-zero elements in the above order, a second array that stores the row numbers of the non-zero elements, and a third array that indicates the locations of the elements that start new columns in the first array are generated. With regard to the compressed row storage format, the elements included in an N×M matrix are searched in row-major order (i.e., in the order of row 1 and column 1, row 1 and column 2, ..., row 1 and column M, row 2 and column 1, row 2 and column 2, ..., row N and column 1, ..., and row N and column M), and only the non-zero elements are extracted from the matrix. Then, a first array that holds the values of the non-zero elements, a second array that stores the column numbers of the non-zero elements, and a third array that indicates the locations of the elements that start new rows in the first array are generated.

By the way, in a large-scale matrix operation, a matrix may be divided so as to be assigned to a plurality of threads which are then executed in parallel by a plurality of processors. This technique achieves high-speed operation. In this case, a plurality of threads may perform operations for the same element of a final result, depending on the way of dividing the matrix. Therefore, it is considered that a storage area for storing an intermediate result may be allocated to each thread.

For example, there has been proposed a parallel processing method for multiplying a sparse matrix represented in the compressed column storage format by a column vector with a plurality of processors. In this parallel processing method, the columns of the matrix are equally divided and assigned to a plurality of threads, and a storage area having the same size as a column vector that is the final result is allocated to each thread. Then, the column vectors that are the intermediate results obtained by the respective threads are added to thereby obtain the final result.

By the way, in a coefficient matrix that represents the coefficients of simultaneous equations, non-zero elements tend to concentrate on the vicinity of a diagonal line and some square areas. Using these characteristics, there has been proposed a high-speed operation method in which a coefficient matrix is divided into a plurality of blocks and calculations for the blocks are carried out in parallel with a plurality of processors.

See, for example, Japanese Laid-open Patent Publication No. 2009-199430 and International Publication Pamphlet No. WO2008/026261.

However, the approach of allocating each of a plurality of threads a storage area for storing a vector that is an intermediate result needs more memory, and this is a problem. For example, consider the case of executing 1000 threads in parallel to multiply a sparse matrix with one million rows and one million columns by a column vector. The data of the sparse matrix may be compressed with a compressed storage format, but for the aforementioned storage areas as a whole, space for storing 1000 column vectors with one million rows needs to be prepared. Therefore, this method needs more memory with an increase in the number of threads.

Another method is that one shared storage area is prepared for a plurality of threads, and the threads sequentially add values to the elements of a resulting vector. However, if a shared storage area is used simply, some threads may possibly add values to the same element (for example, in the same row of the resulting column vector) at the same time, which is an access conflict. If exclusive control is exercised between the threads so as not to cause access conflict, the overhead for memory access may increase and the efficiency of the parallel processing may decrease.

SUMMARY

According to one embodiment, there is provided a non-transitory computer-readable storage medium storing therein a memory allocating program. The memory allocating program causes a computer capable of executing a plurality of threads in parallel to perform a process that includes: assigning calculation of a first submatrix included in a matrix to a first thread and calculation of a second submatrix included in the matrix to a second thread, the matrix including zero elements and non-zero elements; comparing a distribution of non-zero elements in rows or columns of the first submatrix with a distribution of non-zero elements in rows or columns of the second submatrix; and determining allocation of storage areas for storing vectors to be respectively used in calculations by the first and second threads, according to a result of the comparing.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates an example of multiplying a sparse matrix by a vector;

DESCRIPTION OF EMBODIMENTS

Figure 1:
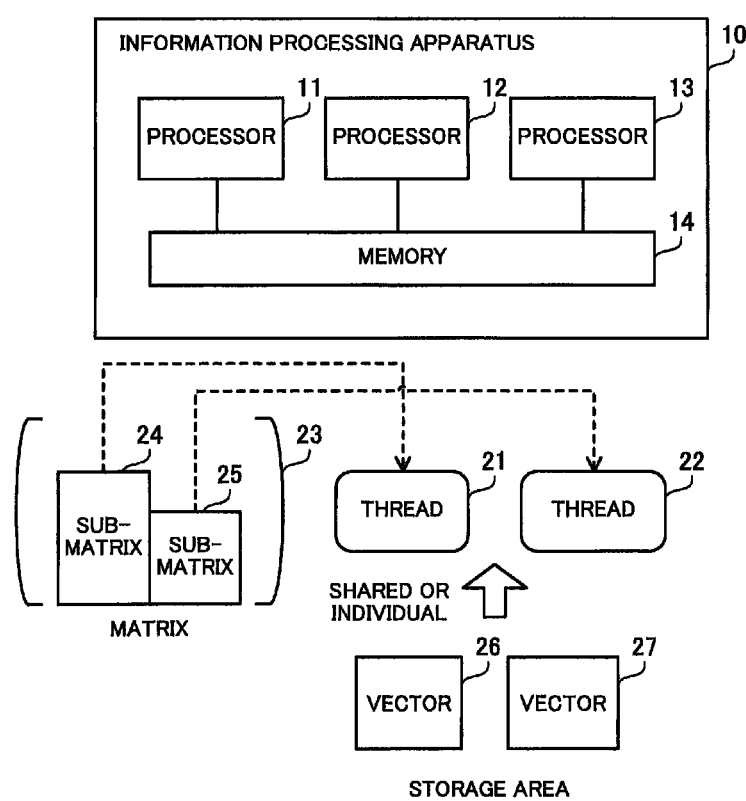
FIG. 1 illustrates an information processing apparatus according to a first embodiment.

Several embodiments will be described below with reference to the accompanying drawings, wherein like reference numerals refer to like elements throughout.

(a) First Embodiment

FIG. 1 illustrates an information processing apparatus according to a first embodiment.

An information processing apparatus 10 of the first embodiment executes a plurality of threads in parallel in order to perform a matrix operation (for example, a matrix-vector multiplication). The information processing apparatus 10 includes a plurality of processors, including processors 11 to 13, and a memory 14.

The processors 11 to 13 are computing devices that are capable of executing threads physically in parallel to one another. Each of the processors 11 to 13 may be a single processor package such as a Central Processing Unit (CPU) package, or a processor core (may simply be referred to as a core) included in a processor package. For example, the processors 11 to 13 execute a program stored in the memory 14. In this first embodiment, the processor 12 executes a thread 21, whereas the processor 13 executes a thread 22. In addition, the processor 11 executes a thread or process for controlling parallelization of the matrix operation. Alternatively, the processor 12 or 13 may be designed to control the parallelization.

The memory 14 is a shared memory that is accessed from the processors 11 to 13, and is a Random Access Memory (RAM), for example. The memory 14 stores one or more vectors to be used in the operations of the threads 21 and 22. In these vectors, values obtained in the middle of the operations of the threads 21 and 22 are stored. In addition, in the vectors, the values of intermediate results (values before a final result is obtained) at the time of completion of the operations of the threads 21 and 22 are stored, for example. In the case where a matrix operation is to multiply a matrix by a column vector, the above vectors are column vectors. In the case where a matrix operation is to multiply a row vector by a matrix, the above vectors are row vectors. In the first embodiment, allocation of storage areas of the memory 14 for storing vectors to the threads 21 and 22 is determined as described below. For example, the information processing apparatus 10 prepares a shared storage area (storage area 26) or individual storage areas (storage areas 26 and 27) for the threads 21 and 22.

First, the processor 11 analyzes a matrix 23 including zero elements and non-zero elements, and assigns the calculations of the submatrices included in the matrix 23 to the threads 21 and 22. The matrix 23 is, for example, a sparse matrix with a high percentage of zero elements and a small percentage of non-zero elements. The matrix 23 may be represented in a compressed storage format such as compressed column storage format or compressed row storage format. In the first embodiment, the processor 11 assigns the calculation of a submatrix 24 to the thread 21, and the calculation of a submatrix 25 to the thread 22. For example, assume that the submatrices 24 and 25 do not overlap in any columns but overlap in some rows. By contrast, for example, it may be assumed that the submatrices 24 and 25 do not overlap in any rows but overlap in some columns.

The processor 11 also analyzes the matrix 23, and allocates the threads 21 and 22 storage areas for storing vectors to be used in their operations. To this end, the processor 11 compares the distribution of non-zero elements of the submatrix 24 with the distribution of non-zero elements of the submatrix 25. For example, in the case where the operation result is a column vector, the processor 11 compares the distributions of non-zero elements in column direction (in a plurality of rows). On the other hand, in the case where the operation result is a row vector, the processor 11 compares the distributions of non-zero elements in row direction (in a plurality of columns).

Then, the processor 11 determines allocation of storage areas to the threads 21 and 22 according to a result of comparing the distributions of non-zero elements. For example, in the case where the submatrices 24 and 25 do not have non-zero elements in the same row (or in the same column), the processor 11 determines that it is possible to allocate a shared storage area to the threads 21 and 22. This is because, if there are no non-zero elements in the same row, the threads 21 and 22 do not access the element in a row of a column vector used in their operations and therefore no access conflict occurs.

Likewise, if there are no non-zero elements in the same column, the threads 21 and 22 do not access the element in a column of a row vector used in their operations and therefore no access conflict occurs.

For example, in the case where the shared storage area 26 is allocated to the threads 21 and 22, the thread 21 stores the values (intermediate result) obtained in the middle of or at the end of the calculation of the submatrix 24 in the storage area 26. The thread 22 stores the values (intermediate result) obtained in the middle of or at the end of the calculation of the submatrix 25 in the storage area 26. At this time, there is no need of performing exclusive control for access to the storage area 26 between the threads 21 and 22. By contrast, in the case where individual storage areas 26 and 27 are allocated to the threads 21 and 22, respectively, the thread 21 stores the values obtained by the calculation of the submatrix 24 in the storage area 26, whereas the thread 22 stores the values obtained by the calculation of the submatrix 25 in the storage area 27. Then, the vectors stored in the storage areas 26 and 27 are added to thereby obtain a final result.

Access conflict between the threads 21 and 22 occurs as a problem, especially, in the following matrix operations. For example, there is a matrix operation to multiply the matrix 23 represented in the compressed column storage format by a column vector. In the case where the matrix is represented in the compressed column storage format, dividing the columns of the matrix makes the operation more efficient. Therefore, in this matrix operation, there is a problem of access conflict to the same row between the threads 21 and 22. Another matrix operation is, for example, to multiply a row vector by the matrix 23 represented in the compressed row storage format. In the case where the matrix is represented in the compressed row storage format, dividing the rows of the matrix makes the operation more efficient. Therefore, there is a problem of access conflict to the same column between the threads 21 and 22.

Further, for example, there is yet another matrix operation in which the matrix 23 is a symmetric matrix, the calculation of a submatrix at a symmetrical position to the submatrix 24 is also assigned to the thread 21, and the calculation of a submatrix at a symmetrical position to the submatrix 25 is also assigned to the thread 22. In this matrix operation, there is a problem of conflict between the threads 21 and 22 with respect to either one of the lower triangle part and upper triangle part of the matrix 23. In the case of multiplying the matrix 23 by a column vector, the problem is access conflict to the same row of the lower triangle submatrix between the threads 21 and 22. On the other hand, in the case of multiplying a row vector by the matrix 23, the problem is access conflict to the same column of the upper triangle submatrix between the threads 21 and 22.

According to the first, embodiment, the information processing apparatus 10 compares the distribution of non-zero elements of the submatrix 24 with the distribution of non-zero elements of the submatrix 25. Then, the information processing apparatus 10 determines allocation of storage areas to the threads 21 and 22 according to the result of the comparison. This avoids access conflict to the same element in the same storage area (for example, this prevents access conflict), and removes the load of exclusive control between the threads 21 and 22. In addition, while preventing an increase in the load due to exclusive control (for example, while eliminating the need of exclusive control), it is possible to reduce the size of the storage area to be prepared in the memory 14. Accordingly, it is possible to efficiently use the storage area of the memory 14 in the matrix operation.

(b) Second Embodiment

Figure 2:
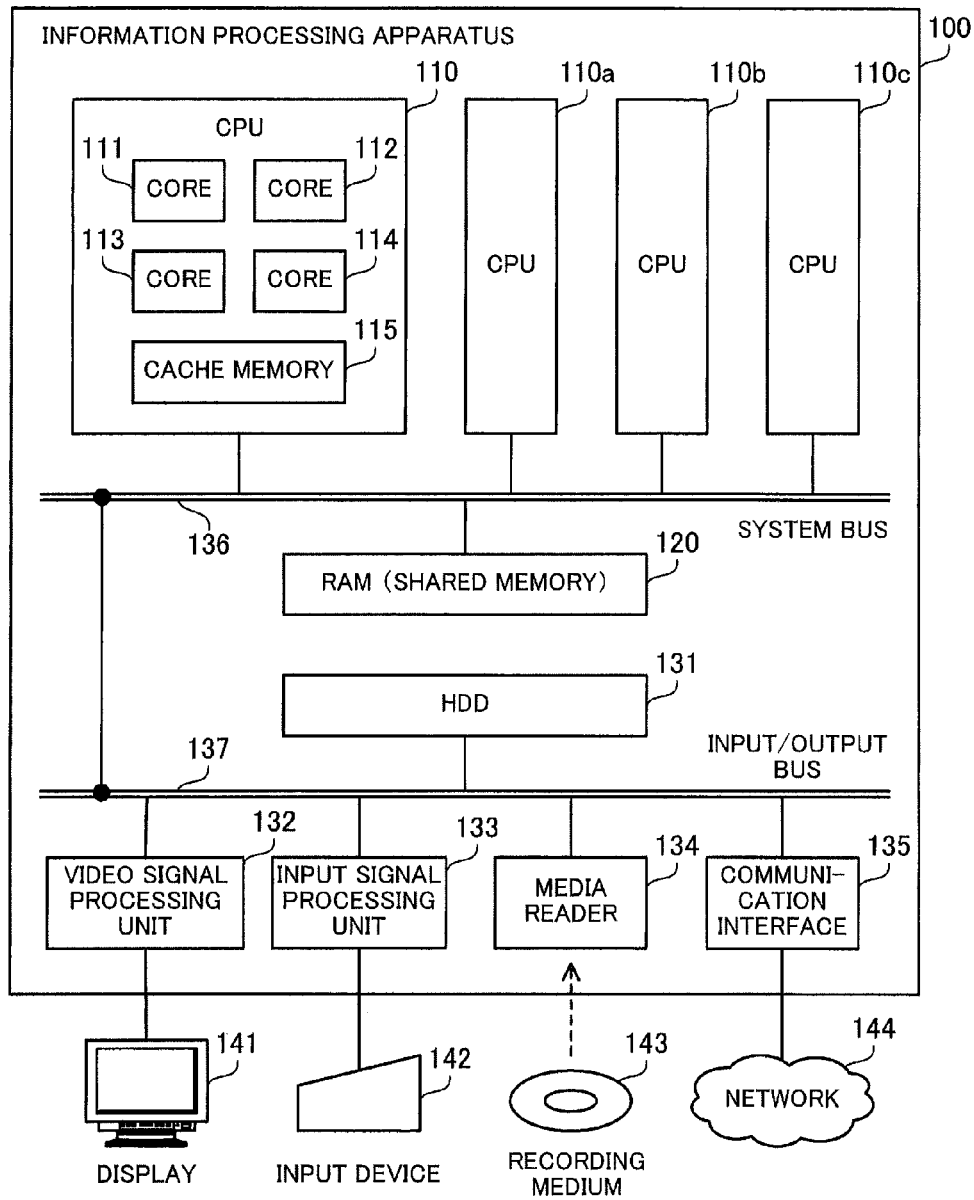
FIG. 2 is a block diagram illustrating an example of the hardware configuration of an information processing apparatus.

FIG. 2 is a block diagram illustrating an example of the hardware configuration of an information processing apparatus.

An information processing apparatus 100 of the second embodiment is a computer that is capable of performing large-scale matrix operation, and is, for example, a server computer that performs matrix operation in response to a user request.

The information processing apparatus 100 includes a plurality of CPUs, including CPUs 110, 110a, 110b, and 110c, and a RAM 120. The plurality of CPUs and the RAM 120 are connected to a system bus 136. In addition, the information processing apparatus 100 includes a Hard Disk Drive (HDD) 131, a video signal processing unit 132, an input signal processing unit 133, a media reader 134, and a communication interface 135. The HDD 131, video signal processing unit 132, input signal processing unit 133, media reader 134, and communication interface 135 are connected to an input/output bus 137. The system bus 136 and input/output bus 137 are connected with a bridge, for example.

The CPUs 110, 110a, 110b, and 110c are processor packages that execute programs. The CPUs 110, 110a, 110b, and 110c load at least some of the instructions of a program or data from the HDD 131 to the RAM 120, and execute the program. Each CPU includes a plurality of cores and a cache memory.

As an example, the CPU 110 includes a plurality of cores, including cores 111 to 114, and a cache memory 115. The cores 111 to 114 execute threads physically in parallel to one another. The cache memory 115 is a volatile memory for temporarily storing the instructions of a program and data read from the RAM 120, and is, for example, a Static Random Access Memory (SRAM). A cache memory may be provided for each core.

The RAM 120 is a shared memory that is accessed from the CPUs 110, 110a, 110b, and 110c via the high-speed system bus 136. The RAM 120 temporarily stores the instructions of a program and data. In this connection, the information processing apparatus 100 may be provided with another type of volatile memory than RAM, or a plurality of memories.

The HDD 131 is a non-volatile storage device for storing software programs, such as an Operating System (OS), application software programs, or other programs, and data. In this connection, the information processing apparatus 100 may be provided with another type of storage device, such as a flash memory, Solid State Drive (SSD), or another, or a plurality of non-volatile storage devices.

The video signal processing unit 132 outputs images to a display 141 connected to the information processing apparatus 100, according to instructions from any of the CPUs. As the display 141, a Cathode Ray Tube (CRT) display, a Liquid Crystal Display (LCD) display, a Plasma Display Panel (PDP), an Organic Electro-Luminescence (OEL) display, or another display may be used.

The input signal processing unit 133 receives an input signal from an input device 142 connected to the information processing apparatus 100, and outputs the input signal to any one of the CPUs. As the input device 142, a pointing device, such as a mouse, touch panel, touchpad, trackball, or another, a keyboard, a remote controller, a button switch, or another device may be used. In addition, plural types of input devises may be connected to the information processing apparatus 100.

The media reader 134 is a driving device that reads programs and data from a recording medium 143. As the recording medium 143, for example, a magnetic disk, such as a flexible disk (FD) or HDD, an optical disc, such as a Compact Disc (CD) or Digital Versatile Disc (DVD), a Magneto-Optical disk (MO), a semiconductor memory, or another may be used. The media reader 134 stores, for example, instructions of a program and data read from the recording medium 143, in the RAM 120 or HDD 131.

The communication interface 135 is connected to a network 144, and enables communication with another information processing apparatus via the network 144. The communication interface 135 may be a wired communication interface that is connected to a communication device such as a switch or a router with a cable, or a wireless communication interface that is connected to a wireless base station.

In this connection, the information processing apparatus 100 may be configured without the media reader 134. Further, if the user is able to control the information processing apparatus 100 over the network 144 from a terminal device, the information processing apparatus 100 may be configured without the video signal processing unit 132 or input signal processing unit 133. In addition, the display 141 and input device 142 may be accommodated as one unit in the casing of the information processing apparatus 100. In this connection, the cores 111 to 114 are an example of the above-described processors 11 to 13, and the RAM 120 is an example of the above-described memory 14.

The following describes a matrix operation that is performed in the second embodiment.

FIG. 3 illustrates an example of multiplying a sparse matrix by a vector.

The information processing apparatus 100 performs iterations of multiplying a matrix by an input vector. The matrix is, for example, a coefficient matrix that represents the coefficients of simultaneous equations. In the first iteration, the information processing apparatus 100 multiplies the matrix by an initial input vector. The information processing apparatus 100 processes the resulting vector of the first iteration according to a specified algorithm, and takes the resultant as the next input vector. In the second iteration, the information processing apparatus 100 multiplies the same matrix as used in the first iteration by the input vector obtained by processing the resulting vector of the first iteration. This matrix operation is repeated until a specific completion condition (for example, the number of iterations, the accuracy of values in the resulting vector, etc.) is satisfied.

The second embodiment uses a matrix that is symmetric and sparse (symmetric sparse matrix), and a column vector as an input vector. Therefore, the resulting vector, which is the product of the symmetric sparse matrix and the column vector, is a column vector. For example, in the case where a 6×6 symmetric sparse matrix includes the first row of (4.0, 9.0, 0, 3.0, 0, 0), and an input vector is (0.1, 0.2, 0.3, 0.4, 0.5, 0.6), a value in the first row of the resulting vector is calculated as 3.4. In the following, a 6×6 matrix is used by way of example for simple description. However, in the second embodiment, it is possible to use a large-scale symmetric sparse matrix like having dimensions (the number of elements in one direction) of several tens of thousands to several tens of millions.

Figure 4:
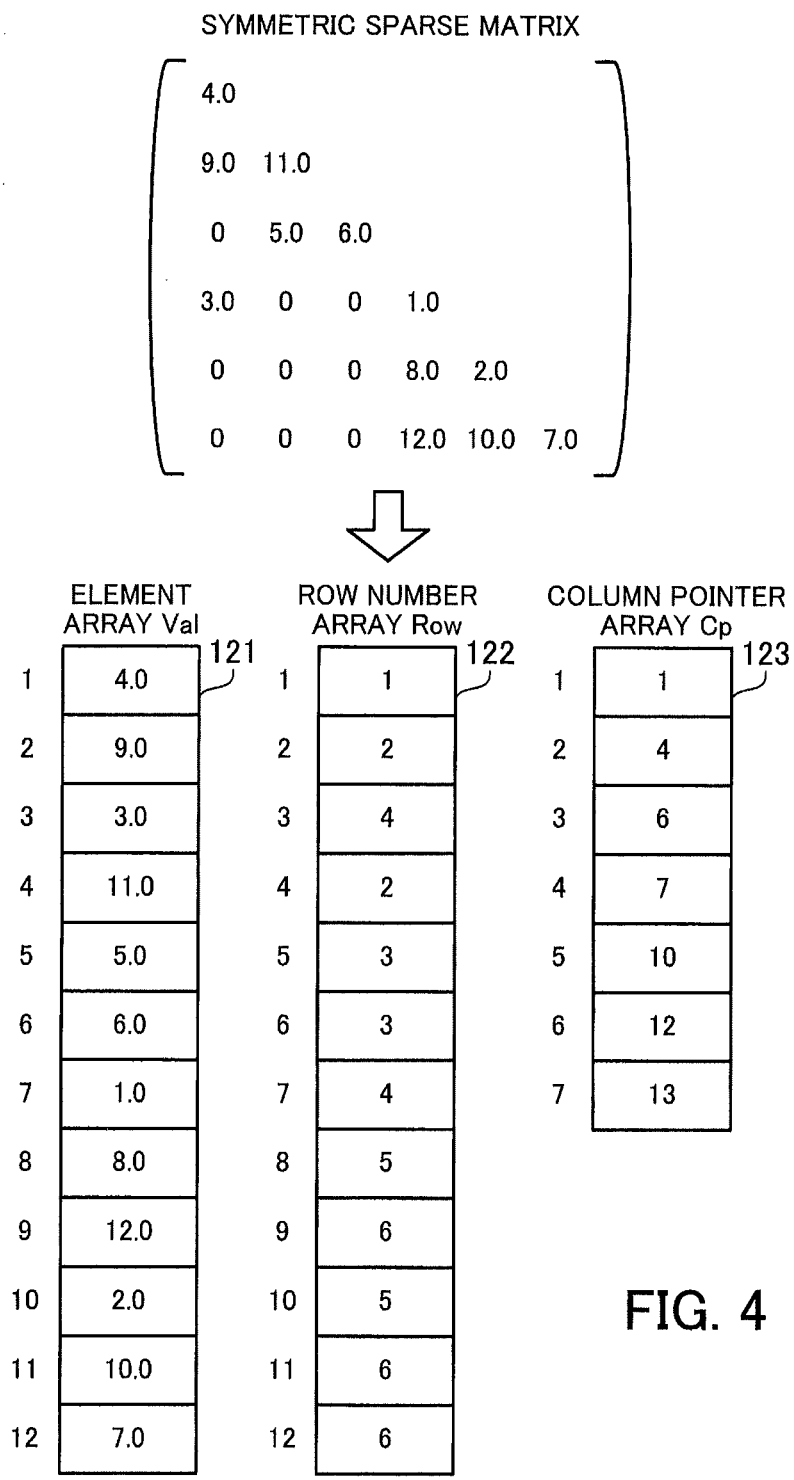
FIG. 4 illustrates an example of a compressed storage format for a sparse matrix.

FIG. 4 illustrates an example of a compressed storage format for a sparse matrix.

In the second embodiment, the lower triangle part of a symmetric sparse matrix is represented in the compressed column storage format. The upper triangle part (excluding diagonal elements) of the symmetric sparse matrix may not be included in the matrix data and may be omitted because it is reproducible from the lower triangle part.

The matrix data includes an element array 121 (Val), a row number array 122 (Row), and a column pointer array 123 (Cp). The element array 121 contains the values of the non-zero elements included in the lower triangle part of the symmetric sparse matrix, in column-major order. The row number array 122 stores the row numbers of the non-zero elements arranged in the element array 121. The k-th value (Row(k)) of the row number array 122 represents the row number of the k-th non-zero element. The length of the element array 121 and row number array 122 is equal to the number of non-zero elements included in the symmetric sparse matrix. The column pointer array 123 indicates the locations of the elements that start new columns in the element array 121. The k-th value (Cp(k)) of the column pointer array 123 represents the element number of the first non-zero element in the k-th column. In this connection, the length of the column pointer array 123 is longer by one than the number of columns of the symmetric sparse matrix. The end of the column pointer array 123 has a value greater by one than the maximum element number.

For example, assume that the lower triangle part of a 6×6 symmetric sparse matrix contains the following elements: the first column of (4.0, 9.0, 0, 3.0, 0, 0), the second column of (11.0, 5.0, 0, 0, 0), the third column of (6.0, 0, 0, 0), the fourth column of (1.0, 8.0, 12.0), the fifth column of (2.0, 10.0), and the sixth column of (7.0).

In this case, the element array 121 is (4.0, 9.0, 3.0, 11.0, 5.0, 6.0, 1.0, 8.0, 12.0, 2.0, 10.0, 7.0). The row number array 122 is (1, 2, 4, 2, 3, 3, 4, 5, 6, 5, 6, 6). The column pointer array 123 is (1, 4, 6, 7, 10, 12, 13). For example, the second non-zero element from the top of the fourth column is specified based on the element array 121, row number array 122, and column pointer array 123 in the following manner. First, from Cp(4)=7, the element number of the first non-zero element in the fourth column is specified as 7, and therefore the element number of the second non-zero element in the fourth column is specified as 8. Then, from Val(8)=8.0 and Row(8)=5, it is specified that the second non-zero element from the top of the fourth column exists in the fifth row and has a value of 8.0.

In this connection, the upper triangle part (including diagonal elements) of the symmetric sparse matrix is reproduced by reading the element array 121, row number array 122 and column pointer array 123 as the arrays for the upper triangle part without any changes to the values. More specifically, the element array 121 is read as an array that contains non-zero elements in row-major order, the row number array 122 is read as a column number array, and the column pointer array 123 is read as a row pointer array. Thus obtained element array, column number array, and row pointer array are a representation of the upper triangle part (including diagonal elements) in the compressed row storage format.

Figure 5:
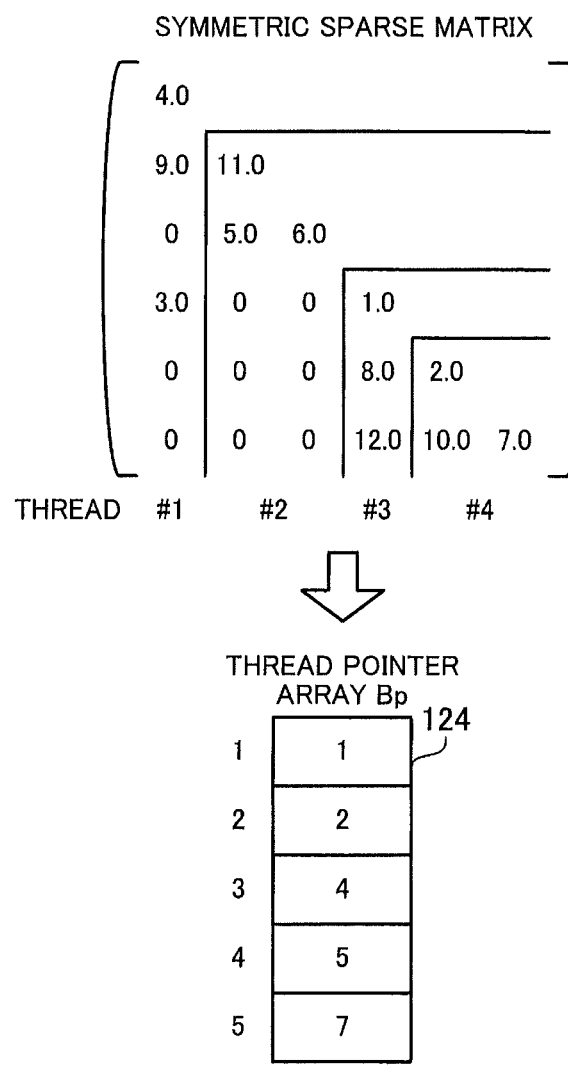
FIG. 5 illustrates an example of division and assignment of a sparse matrix to threads.

FIG. 5 illustrates an example of division and assignment of a sparse matrix to threads.

The information processing apparatus 100 divides a symmetric sparse matrix into a plurality of submatrices that are then assigned to a plurality threads, and executes the threads in parallel with a plurality of cores. In the second embodiment, the information processing apparatus 100 assigns each thread one or two or more successive columns of the lower triangle part of the symmetric sparse matrix. In addition, the information processing apparatus 100 assigns each thread one or two or more rows of the upper triangle part (excluding diagonal elements) of the symmetric sparse matrix. In the assignment, the j-th column of the lower triangle part and the j-th row of the upper triangle part (excluding diagonal elements), which are at symmetrical positions, are assigned to the same thread.

Since the symmetric sparse matrix is represented in the compressed column storage format, the information processing apparatus 100 first determines a mapping between the columns of the lower triangle part and threads. A mapping between the rows of the upper triangle part (excluding diagonal elements) and the threads is automatically determined accordingly. At this time, the information processing apparatus 100 assigns the threads as equal a number of non-zero elements as possible. For example, assuming that the length of the element array 121 is 12 and there are four threads that are executable in parallel, the information processing apparatus 100 divides the element array 121 such that each thread handles as many non-zero elements close to 12/4=3 as possible. Referring to the example of FIG. 5, the first column of the lower triangle part is assigned to a thread #1, the second and third columns are assigned to a thread #2, the fourth column is assigned to a thread #3, and the fifth and sixth columns are assigned to a thread #4.

After dividing the symmetric sparse matrix, the information processing apparatus 100 generates a thread pointer array 124 (Bp). The thread pointer array 124 contains the column numbers identifying the first columns of the column groups assigned to the respective threads. Sequential thread numbers are given to the plurality of threads. The k-th value (Bp(k)) of the thread pointer array 124 represents the first column of the column group assigned to the thread #k. In this connection, the length of the thread pointer array 124 is longer by one than the number of threads. The end of the thread pointer array 124 contains a value greater by one than the number of columns of the symmetric sparse matrix.

Figure 6:
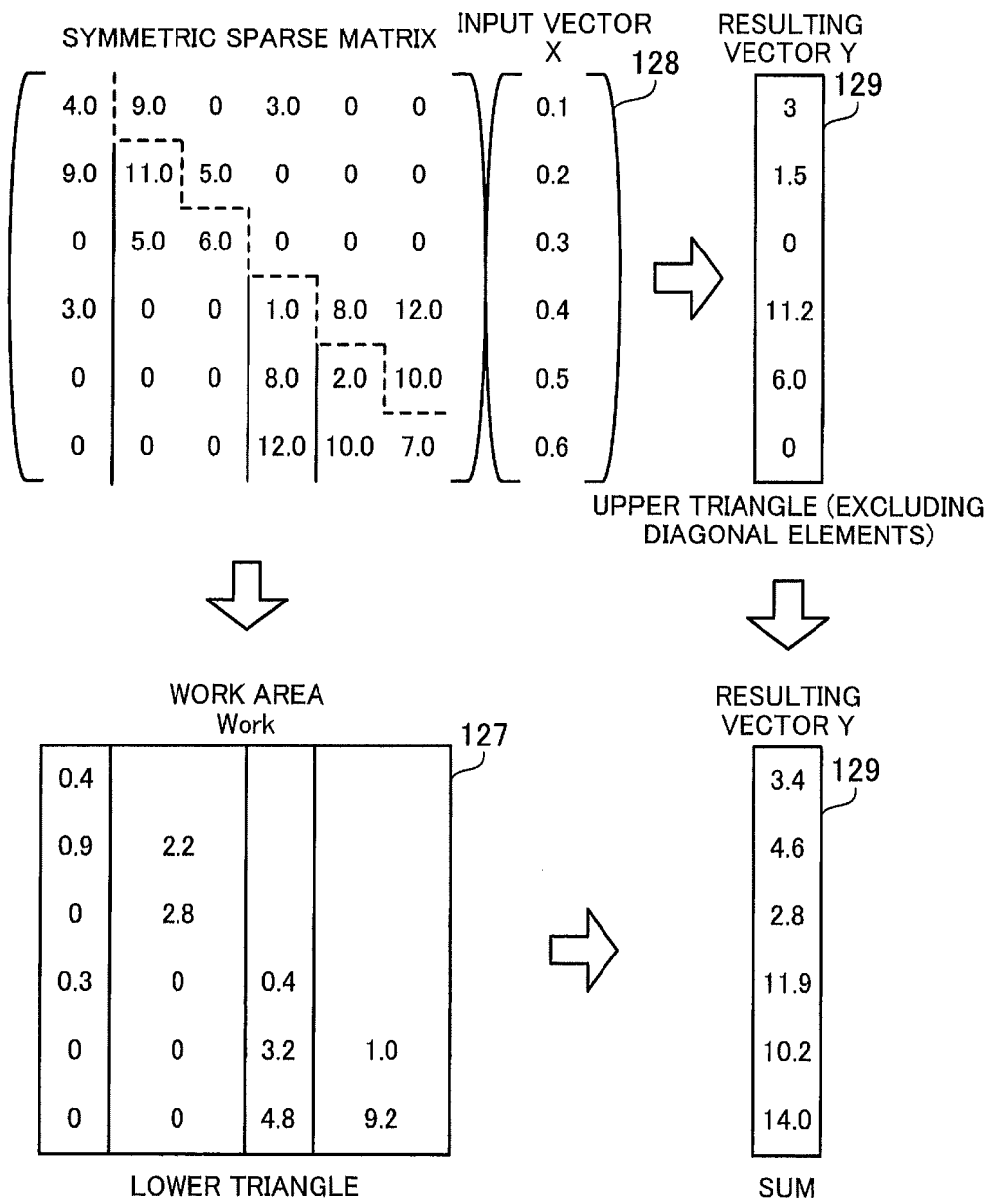
FIG. 6 illustrates an example of parallel calculation for multiplying a sparse matrix by a vector.

FIG. 6 illustrates an example of parallel calculation for multiplying a sparse matrix by a vector.

The element array 121, row number array 122, column pointer array 123, and thread pointer array 124 are stored in the RAM 120. In addition, a work area 127 (Work), an input vector 128 (X), and a resulting vector 129 (Y) are stored in the RAM 120.

The work area 127 includes one or two or more work vectors that are column vectors, for storing intermediate results. Values obtained by each thread with respect to a submatrix of the lower triangle part are stored in the work area 127. On the other hand, values obtained by each thread with respect to the upper triangle part (excluding diagonal elements) are stored directly in the resulting vector 129. After the execution of the plurality of threads is complete, the one or two or more work vectors are added to the resulting vector 129. The following describes the case where one work vector is prepared for each thread in the work area 127.

With respect to the lower triangle part, the thread #1 adds the product of the non-zero element in row 1 and column 1 and the first row of the input vector 128 to the element in the first row of the work vector allocated to the thread #1 (i.e., the element in row 1 and column 1) in the work area 127. Similarly, the thread #1 adds the product of the non-zero element in row 2 and column 1 and the first row of the input vector 128 to the element in row 2 and column 1 of the work area 127, and adds the product of the non-zero element in row 4 and column 1 and the first row of the input vector 128 to the element in row 4 and column 1 of the work area 127. With respect to the upper triangle part (excluding diagonal elements), the thread #1 adds the product of the non-zero element in row 1 and column 2 and the second row of the input vector 128 to the element in the first row of the resulting vector 129, and adds the product of the non-zero element in row 1 and column 4 and the fourth row of the input vector 128 to the element in the first row of the resulting vector 129.

With respect to the lower triangle part, the thread #2 adds the product of the non-zero element in row 2 and column 2 and the second row of the input vector 128 to the element in row 2 and column 2 of the work area 127. The thread #2 also adds the product of the non-zero element in row 3 and column 2 and the second row of the input vector 128 to the element in row 3 and column 2 of the work area 127, and adds the product of the non-zero element in row 3 and column 3 and the third row of the input vector 128 to the element in row 3 and column 2 of the work area 127. With respect to the upper triangle part (excluding diagonal elements), the thread #2 adds the product of the non-zero element in row 2 and column 3 and the third row of the input vector 128 to the element in the second row of the resulting vector 129.

Similarly, the thread #3 adds values to the elements in row 4 and column 3, row 5 and column 3, and row 6 and column 3 of the work area 127, and adds a value to the element in the fourth row of the resulting vector 129. The thread #4 adds values to the elements in row 5 and column 4 and row 6 and column 4 of the work area 127, and adds a value to the element in the fifth row of the resulting vector 129. After the execution of the threads #1 to #4 is complete, the information processing apparatus 100 adds the four work vectors included in the work area 127 to the resulting vector 129. Thus obtained resulting vector 129 represents the product of the symmetric sparse matrix and the input vector 128.

In the above example, different work vectors are allocated to different threads. In this method, however, many elements in the work area 127 remain zero because no value is added thereto. For example, referring to FIG. 6, the values in row 4 and column 2, row 5 and column 2, and row 6 and column 2 of the work area 127 remain zero. Even if locations in row 4 and column 2, row 5 and column 2, and row 6 and column 2 are used by the thread #3, no access conflict occurs between the threads #2 and #3. In addition, each work vector is added to the resulting vector 129. Therefore, although values to be added need to be in a proper row, the final result is not affected by which columns these values exist in. Considering this, the information processing apparatus 100 of the second embodiment is designed to allocate a shared work vector of the work area 127 to two or more threads if no access conflict occurs.

Figure 7:
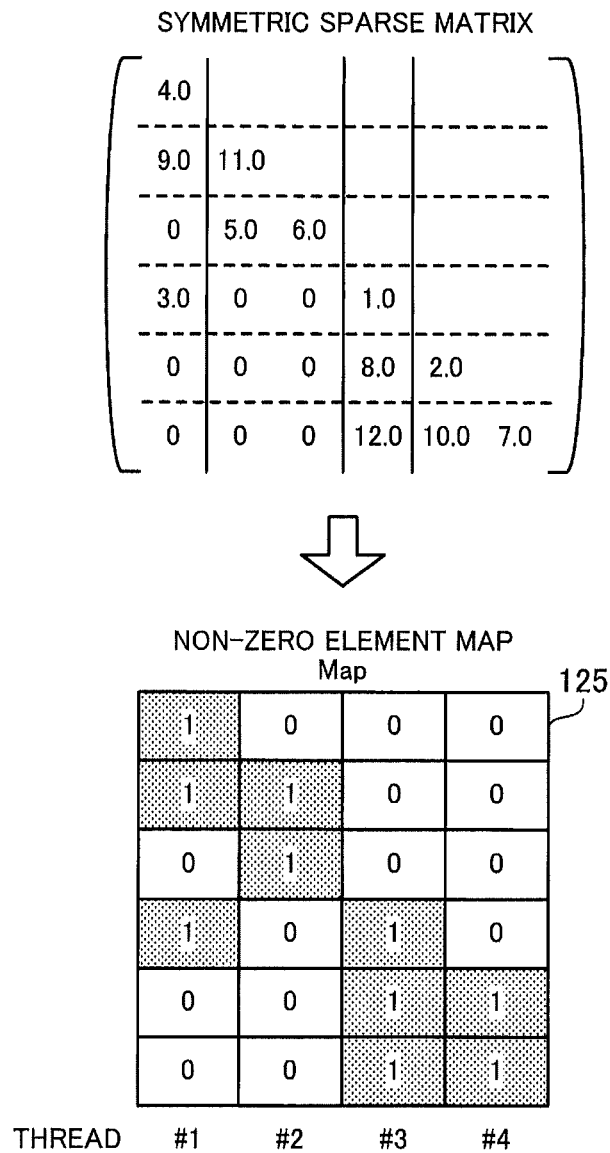
FIG. 7 illustrates an example of a non-zero element map.

FIG. 7 illustrates an example of a non-zero element map.

The information processing apparatus 100 analyzes a symmetric sparse matrix to determine how many work vectors to prepare and how the work vectors are allocated to threads. In the analysis of the symmetric sparse matrix, the information processing apparatus 100 divides the rows of the symmetric sparse matrix into a plurality of row groups. Preferably, the groups have as equal a number of rows as possible. The information processing apparatus 100 previously determines the number of groups (the number of divisions), or changes the number of divisions according to the dimensions of the symmetric sparse matrix. For example, the number of divisions may be set to 100 with respect to a symmetric sparse matrix having the dimensions of about several tens of thousands.

Then, with respect to the lower triangle part of the symmetric sparse matrix, the information processing apparatus 100 confirms whether a non-zero element exists or not in each block obtained by partitioning the lower triangle part in row direction and column direction, and generates a non-zero element map 125 (Map) representing the distribution of non-zero elements. The rows of the non-zero element map 125 correspond to the above row groups, and the columns of the non-zero element map 125 correspond to threads (that is, the column groups of the symmetric sparse matrix assigned to the threads). In the non-zero element map 125, the state of each block is represented by one-bit flag. A flag of "1" indicates that there is at least one non-zero element in the block. A flag of "0" indicates that there is no non-zero element in the block.

For example, a 6×4 non-zero element map 125 is generated from the lower triangle part of a 6×6 symmetric sparse matrix that is partitioned as illustrated in FIG. 5. In this case, one row of the non-zero element map 125 corresponds to one row of the symmetric sparse matrix. For example, a flag of "1" is contained in locations in row 1 and column 1, row 2 and column 1, row 4 and column 1, row 2 and column 2, row 3 and column 2, row 4 and column 3, row 5 and column 3, row 6 and column 3, row 5 and column 4, and row 6 and column 4 of the non-zero element map 125. A flag of "0" is contained in the other locations. By comparing the columns of the non-zero element map 125 with each other, a combination of threads to which a shared work vector is allocable is detected.

Figure 8:
FIG. 8 illustrates another example of the non-zero element map.

FIG. 8 illustrates another example of the non-zero element map.

The following describes the case of executing eight threads in parallel in order to process a 2534×2534 symmetric sparse matrix. Assuming that the rows are divided into eight row groups, the number of rows in each group is 317 (obtained by rounding up 2534/8 to the nearest integer). However, the last group contains 315 rows because of the rounding process. The information processing apparatus 100 generates an 8×8 non-zero element map 125, and confirms whether at least one non-zero element exists in each block or not. In a large-scale symmetric sparse matrix, non-zero elements tend to concentrate on the vicinity of a diagonal line. In this case, as illustrated in FIG. 8, the diagonal elements and some elements adjacent to the diagonal elements in the non-zero element map 125 have a flag of "1", and many other elements in the non-zero element map 125 have a flag of "0".

Figure 9:
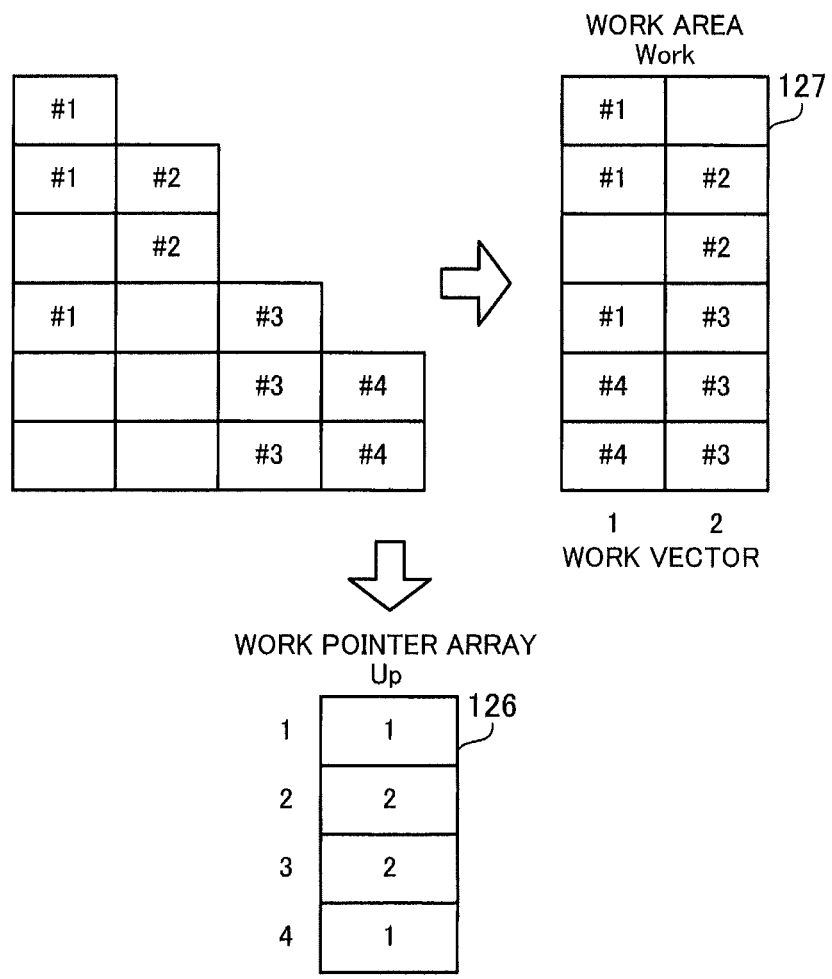
FIG. 9 illustrates an example of allocation of work vectors.

FIG. 9 illustrates an example of allocation of work vectors.

As described earlier, the information processing apparatus 100 searches for a combination of threads to which a shared work vector is allocable, with reference to the non-zero element map 125. More specifically, the information processing apparatus 100 searches the non-zero element map 125 for a combination of columns that does not have a flag of "1" in the same row. Referring to the example of the non-zero element map 125 of FIG. 7, each of combinations of the first and fourth columns and the second and third columns does not have a conflict regarding a flag of "1".

In this case, for example, the information processing apparatus 100 allocates a work vector 1 (the first column of the work area 127) to the threads #1 and #4, and allocates a work vector 2 (the second column of the work area 127) to the threads #2 and #3. That is to say, only two work vectors need to be prepared for the four threads (threads #1 to #4) in the work area 127. After the allocation of the work vectors to the respective threads, the information processing apparatus 100 generates a work pointer array 126 (Up) that contains the vector numbers of the work vectors to be used by the threads. The k-th value (Up(k)) of the work pointer array 126 represents the work vector to be used by the thread #k.

Figure 10:
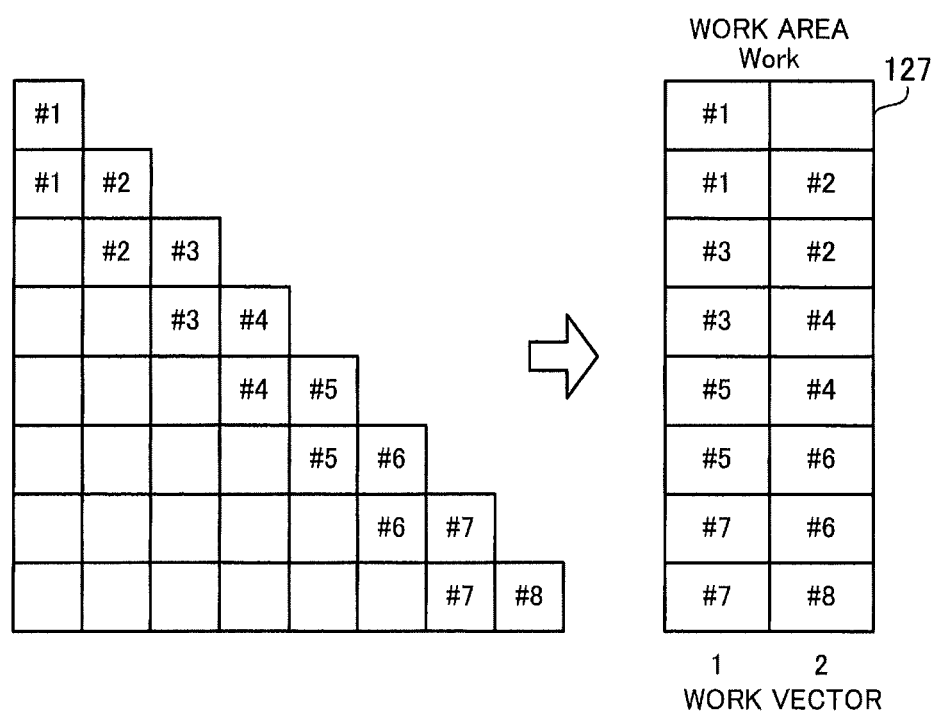
FIG. 10 is a first diagram illustrating another example of allocation of work vectors.

FIG. 10 is a first diagram illustrating another example of allocation of work vectors.

The following describes the case of executing eight threads in parallel in order to process a symmetric sparse matrix and dividing the rows of the symmetric sparse matrix into eight row groups. Non-zero elements exist in the groups 1 and 2 of a thread #1, the groups 2 and 3 of a thread #2, the groups 3 and 4 of a thread #3, the groups 4 and 5 of a thread #4, the groups 5 and 6 of a thread #5, the groups 6 and 7 of a thread #6, the groups 7 and 8 of a thread #7, and the group 8 of a thread #8. Non-zero elements do not exist in the other groups.

In this case, even if a shared work vector is allocated to the threads #1, #3, #5, and #7, access conflict to the same element of a work vector among these threads will not occur. In addition, even if a shared work vector is allocated to the threads #2, #4, #6, and #8, access conflict to the same element of a work vector among these threads will not occur. Therefore, for example, the information processing apparatus 100 allocates a work vector 1 to the threads #1, #3, #5, and #7, and allocates a work vector 2 to the threads #2, #4, #6, and #8. That is to say, only two work vectors need to be prepared for these eight threads (threads #1 to #8).

As described above, a shared work vector may be allocated to three or more threads. In many large-scale symmetric sparse matrices, determining appropriate combinations of threads makes it possible to reduce the number of work vectors prepared in the work area 127 to two or three.

Figure 11:
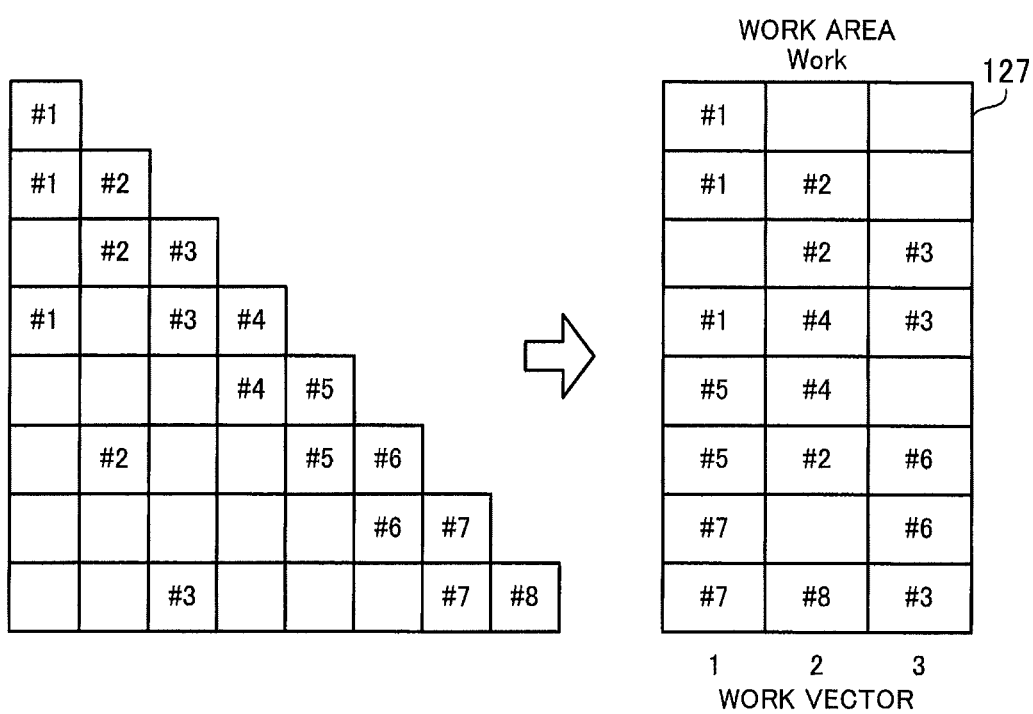
FIG. 11 is a second diagram illustrating another example of allocation of work vectors.

FIG. 11 is a second diagram illustrating another example of allocation of work vectors.

The following describes the case of executing eight threads in parallel in order to process a symmetric sparse matrix and dividing the rows of the symmetric sparse matrix into eight row groups. Non-zero elements exist in the groups 1, 2, and 4 of a thread #1, the groups 2, 3, and 6 of a thread #2, the groups 3, 4, and 8 of a thread #3, the groups 4 and 5 of a thread #4, the groups 5 and 6 of a thread #5, the groups 6 and 7 of a thread #6, the groups 7 and 8 of a thread #7, and the group 8 of a thread #8. Non-zero elements do not exist in the other groups.

In this case, for example, the information processing apparatus 100 allocates a work vector 1 to the threads #1, #5, and #7, allocates a work vector 2 to the threads #2, #4, and #8, and allocates a work vector 3 to the threads #3 and #6. That is to say, only three work vectors need to be prepared in the work area 127 for the eight threads (threads #1 to #8).

Figure 12:
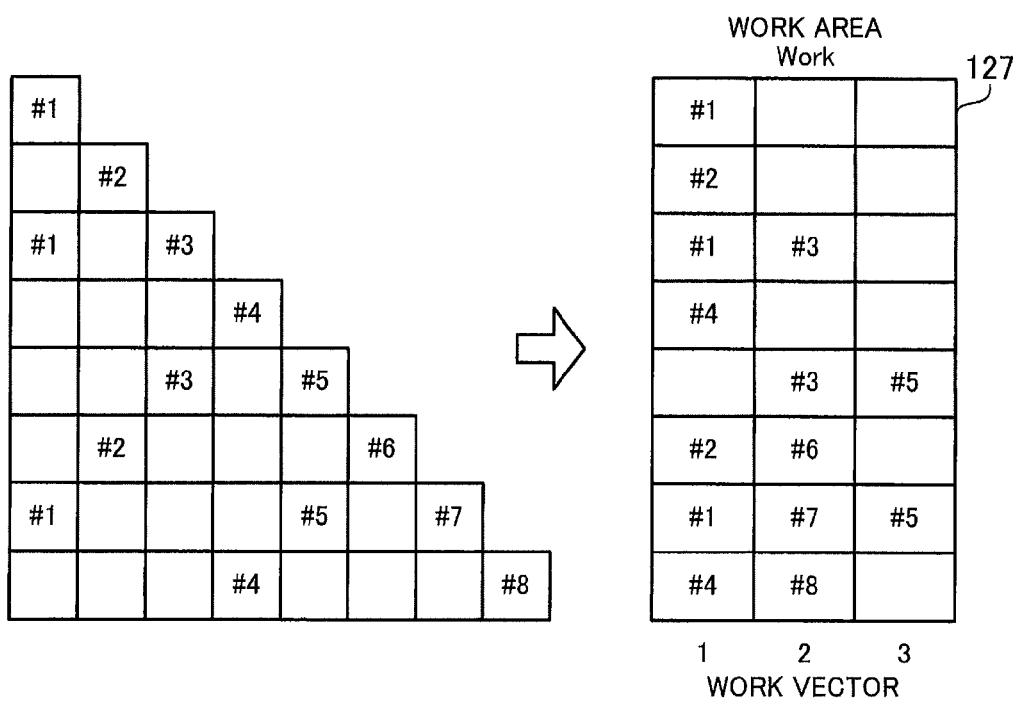
FIG. 12 is a third diagram illustrating another example of allocation of work vectors.

FIG. 12 is a third diagram illustrating another example of allocation of work vectors.

Similarly to FIG. 10, the following describes the case of executing eight threads in parallel in order to process a symmetric sparse matrix and dividing the rows of the symmetric sparse matrix into eight row groups. Non-zero elements exist in the groups 1, 3, and 7 of a thread #1, the groups 2 and 6 of a thread #2, the groups 3 and 5 of a thread #3, the groups 4 and 8 of a thread #4, the groups 5 and 7 of a thread #5, the group 6 of a thread #6, the group 7 of a thread #7, and the group 8 of a thread #8. Non-zero elements do not exist in the other groups.

In this case, for example, the information processing apparatus 100 allocates a work vector 1 to the threads #1, #2, and #4, allocates a work vector 2 to the threads #3, #6, #7, and #8, and allocates a work vector 3 to the thread #5. That is to say, only three work vectors need to be prepared in the work area 127 for the eight threads (threads #1 to #8).

By the way, combinations of threads that do not cause an access conflict may be found with various kinds of algorithms. The combination examples of FIGS. 9 to 12 are detected by sequentially comparing already prepared work vectors with the columns of the non-zero element map 125 in order from the left column to find a work vector where conflict regarding the flag of "1" does not occur, and preparing a new work vector if there is no such a work vector.

For example, referring to FIG. 12, the information processing apparatus 100 prepares the work vector 1 and allocates the work vector 1 to the thread #1. Then, since it is possible to add the thread #2 to the work vector 1, the information processing apparatus 100 allocates the work vector 1 to the thread #2.

Then, since it is not possible to add the thread #3 to the work vector 1, the information processing apparatus 100 prepares the work vector 2 and allocates the work vector 2 to the thread #3.

Then, since it is possible to add the thread #4 to the work vector 1, the information processing apparatus 100 allocates the work vector 1 to the thread #4. Then, since it is not possible to add the thread #5 to either of the work vectors 1 and 2, the information processing apparatus 100 prepares the work vector 3 and allocates the work vector 3 to the thread #5. Then, since it is not possible to add the thread #6 to the work vectors 1 but it is possible to add the thread #6 to the work vector 2, the information processing apparatus 100 allocates the work vector 2 to the thread #6. Subsequently, the information processing apparatus 100 allocates the work vector 2 to the threads #7 and #8 in the same way.

It should be noted that, if the distribution of non-zero elements in a symmetric sparse matrix is complex, the number of work vectors prepared in the work area 127 may be different depending on an employed search algorithm.

Figure 13:
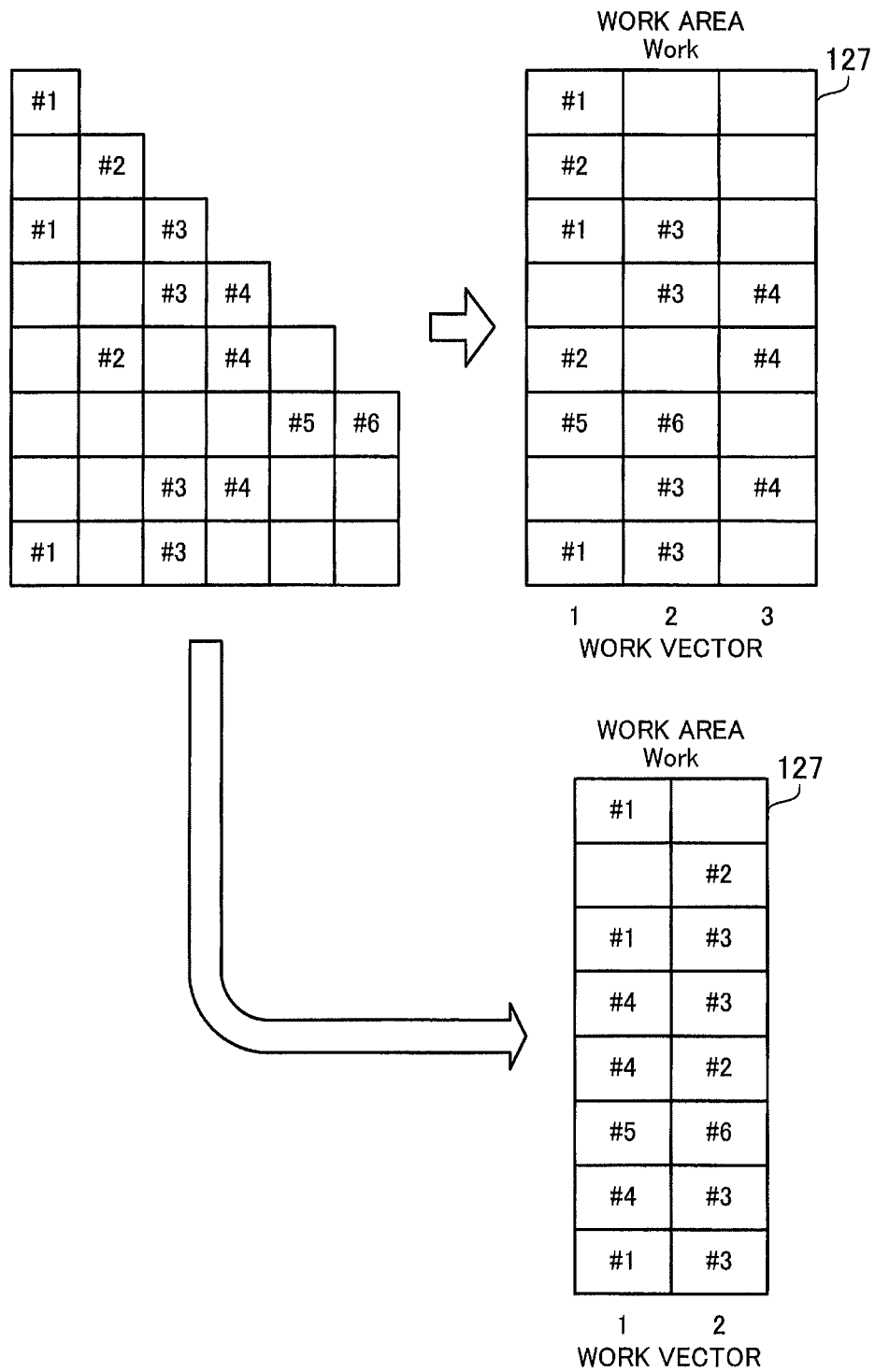
FIG. 13 is a fourth diagram illustrating another example of allocation of work vectors.

FIG. 13 is the fourth diagram illustrating another example of allocation of work vectors.

This example describes the case of executing six threads in order to process a symmetric sparse matrix and dividing the rows of the symmetric sparse matrix into eight row groups. Non-zero elements exist in the groups 1, 3, and 8 of a thread #1, the groups 2 and 5 of a thread #2, the groups 3, 4, 7, and 8 of a thread #3, the groups 4, 5, and 7 of a thread #4, and the group 6 of a thread #5, and the groups 6 of a thread #6.

According to a certain search algorithm (for example, the aforementioned algorithm), for example, the information processing apparatus 100 allocates a work vector 1 to the threads #1, #2, and #5, a work vector 2 to the threads #3 and #6, and a work vector 3 to the thread #4. That is, three work vectors are prepared in the work area 127. On the other hand, according to another search algorithm, for example, the information processing apparatus 100 allocates a work vector 1 to the threads #1, #4, and #5, and a work vector 2 to the threads #2, #3, and #6. That is, two work vectors, which are fewer than those of the former search algorithm, are prepared in the work area 127.

In general, a search algorithm for minimizing the number of work vectors (an algorithm that provides an optimal solution) needs larger amount of calculation than the other search algorithms (algorithms that provide suboptimal solutions). The information processing apparatus 100 may be designed to select a search algorithm to be used, taking into account a balance between the accuracy of solution and the amount of calculation. In the following description, it is assumed that the information processing apparatus 100 uses a search algorithm that provides a suboptimal solution with a small amount of calculation.

The following describes the functions and processes of the information processing apparatus 100.

Figure 14:
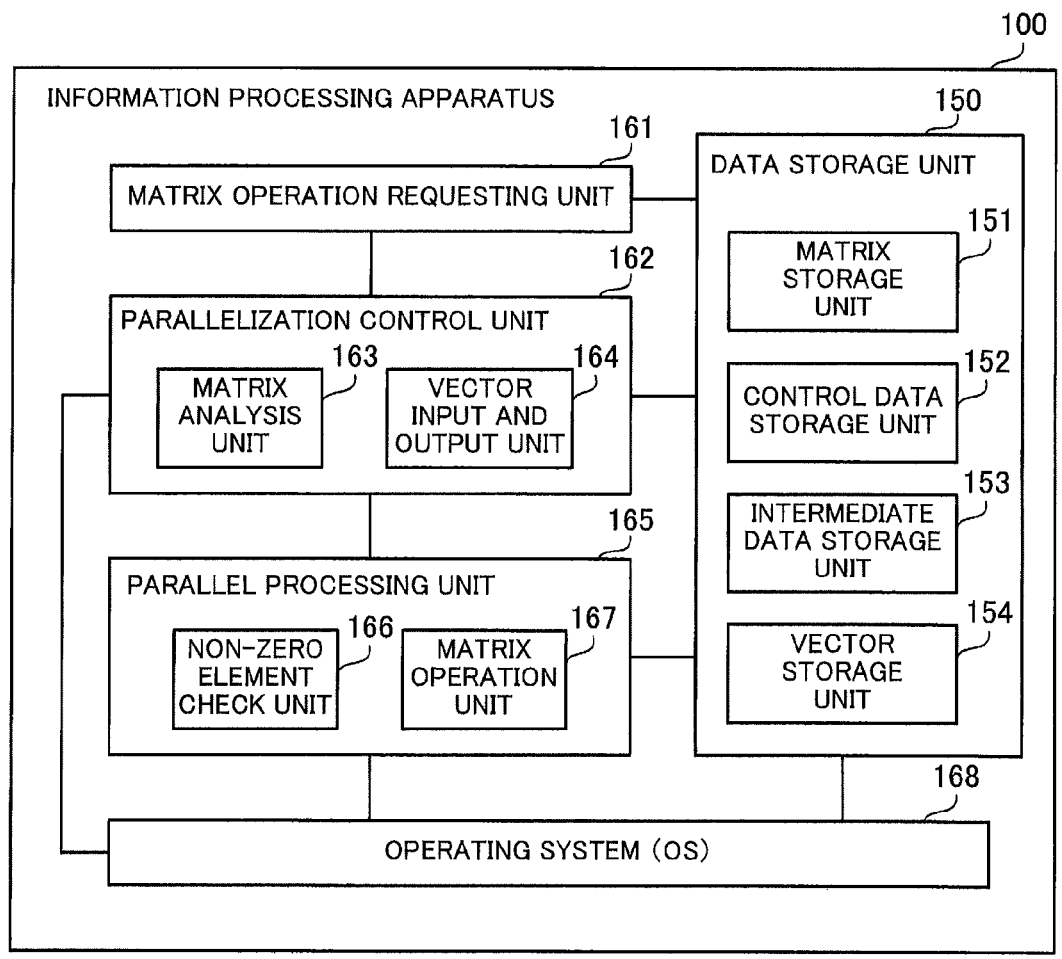
FIG. 14 is a block diagram illustrating an example of the functions of the information processing apparatus.

FIG. 14 is a block diagram illustrating an example of the functions of an information processing apparatus.

The information processing apparatus 100 includes a data storage unit 150, a matrix operation requesting unit 161, a parallelization control unit 162, a parallel processing unit 165, and an OS 168. The data storage unit 150 is implemented as a storage area saved in the RAM 120. The matrix operation requesting unit 161, parallelization control unit 162, and parallel processing unit 165 are implemented as software modules. The parallelization control unit 162 and parallel processing unit 165 may be implemented as a numerical calculation library.

The data storage unit 150 includes a matrix storage unit 151, a control data storage unit 152, an intermediate data storage unit 153, and a vector storage unit 154. The matrix storage unit 151 stores matrix data representing a symmetric sparse matrix. The matrix data includes an element array 121, a row number array 122, and a column pointer array 123. The control data storage unit 152 stores control data for use in controlling parallelization. The control data includes a thread pointer array 124, a non-zero element map 125, and a work pointer array 126. The intermediate data storage unit 153 includes a work area 127. The vector storage unit 154 stores an input vector 128 and a resulting vector 129.

The matrix operation requesting unit 161 stores the element array 121, row number array 122, column pointer array 123, and input vector 128 in the data storage unit 150, and requests the parallelization control unit 162 to multiply the symmetric sparse matrix by the input vector 128. When obtaining the resulting vector 129, the matrix operation requesting unit 161 processes the resulting vector 129 for use as the next input vector 128. The matrix operation requesting unit 161 repeatedly requests the parallelization control unit 162 to multiply the symmetric sparse matrix by the input vector 128 until the number of iterations or an operation status such as the accuracy of values included in the resulting vector 129 satisfies a specific completion condition.

The parallelization control unit 162 controls the parallelization of the matrix operation. The parallelization control unit 162 includes a matrix analysis unit 163 and a vector input and output unit 164.

When a symmetric sparse matrix is specified by the matrix operation requesting unit 161 for the first time (when the first iteration of the iterative operation is performed), the matrix analysis unit 163 analyzes the symmetric sparse matrix and determines a parallelization method. The matrix analysis unit 163 divides the symmetric sparse matrix and assigns the divisions to a plurality of threads. The number of threads for performing the matrix operation is determined, for example, based on conditions such as the amount of hardware resources of the information processing apparatus 100, the current workload of the information processing apparatus 100, user contract, or others. In addition, the matrix analysis unit 163 determines the number of work vectors to be prepared in the work area 127, and allocates any of the work vectors to each of the plurality of threads.

The vector input and output unit 164 initializes the work area 127 and resulting vector 129 each time the input vector 128 is specified by the matrix operation requesting unit 161 (for each iteration of the iterative operation). Then, when the matrix operation for the plurality of threads is completed, the vector input and output unit 164 adds all the work vectors included in the work area 127 to the resulting vector 129, to thereby obtain a final solution as the product of the symmetric sparse matrix and input vector 128.

The parallel processing unit 165 performs the functions of a plurality of threads to be executed in parallel. The parallel processing unit 165 includes a non-zero element check unit 166 and a matrix operation unit 167.

In response to a request from the matrix analysis unit 163, the non-zero element check unit 166 confirms the distribution of non-zero elements with respect to the submatrix assigned to each thread, and updates the flags for the columns corresponding to the thread in the non-zero element map 125. That is to say, the generation of the non-zero element map 125 is parallelized using the plurality of threads. In this connection, each thread is able to identify the assigned columns of the symmetric sparse matrix with reference to the thread pointer array 124.

In response to a request from the vector input and output unit 164, the matrix operation unit 167 multiplies a submatrix assigned to each thread by the input vector 128. With respect to the lower triangle part of the symmetric sparse matrix, the matrix operation unit 167 stores operation results in the work vector allocated by the matrix analysis unit 163. With respect to the upper triangle part (excluding diagonal elements) of the symmetric sparse matrix, on the other hand, the matrix operation unit 167 stores operation results in the resulting vector 129.

In response to a request from the matrix analysis unit 163, the OS 168 activates a plurality of threads, and assigns the plurality of threads to a plurality of cores included in the CPUs 110, 110a, 110b, and 110c. As a rule, different threads are assigned to different cores. In addition, in response to a request from the matrix analysis unit 163, the OS 168 prepares the work area 127 in the RAM 120. In this connection, it is preferable that threads or processes corresponding to the parallelization control unit 162, parallel processing unit 165, and OS 168 are performed by different cores.

Figure 15:
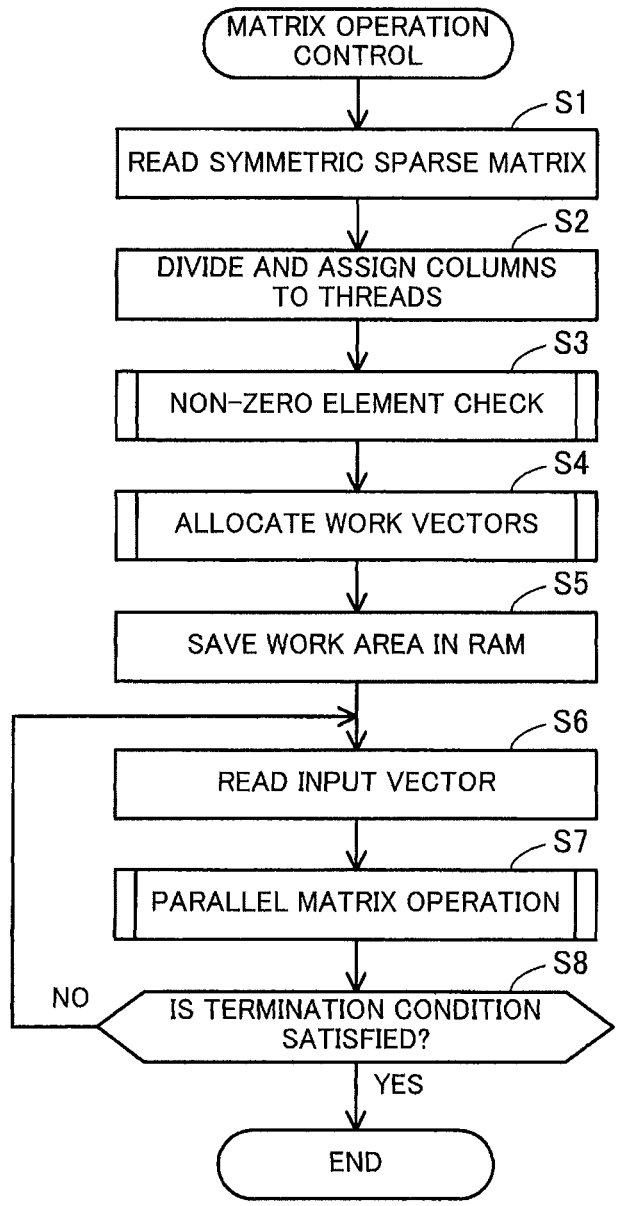
FIG. 15 is a flowchart illustrating how to control matrix operation.

FIG. 15 is a flowchart illustrating how to control matrix operation.

(S1) The matrix operation requesting unit 161 stores an element array 121, a row number array 122, and a column pointer array 123 that represent a symmetric sparse matrix, in the matrix storage unit 151. The matrix analysis unit 163 reads the row number array 122 and column pointer array 123 from the matrix storage unit 151.

(S2) The matrix analysis unit 163 determines how many threads to use in the matrix operation, and instructs the OS 168 to activate the determined number of threads. At this time, the matrix analysis unit 163 gives sequential thread numbers to the threads. In addition, the matrix analysis unit 163 detects the number of non-zero elements included in the symmetric sparse matrix with reference to the element array 121, and divides the columns of the symmetric sparse matrix so that the divisions contain as equal a number of non-zero elements as possible. Then, the matrix analysis unit 163 generates and stores a thread pointer array 124 in the control data storage unit 152.

(S3) The matrix analysis unit 163 generates and stores a non-zero element map 125 in the control data storage unit 152. Then the matrix analysis unit 163 calls the non-zero element check unit 166 for each thread. For each thread, the non-zero element check unit 166 updates the flags for the columns corresponding to the thread in the non-zero element map 125. This non-zero element check will be described in detail later.

(S4) The matrix analysis unit 163 determines how many work vectors to prepare in the work area 127 and how to allocate the work vectors to the threads, with reference to the non-zero element map 125 generated at step S3. Then, the matrix analysis unit 163 generates and stores a work pointer array 126 in the control data storage unit 152. This allocation of work vectors will be described in detail later.

(S5) The matrix analysis unit 163 instructs the OS 168 to prepare the work area 127 including as many work vectors as determined at step S4, in the intermediate data storage unit 153. Then, the matrix analysis unit 163 generates and stores an empty resulting vector 129 in the vector storage unit 154.

(S6) The matrix operation requesting unit 161 stores the input vector 128 in the vector storage unit 154. In this connection, the initial input vector 128 that is used in the first iteration of the iterative operation may be stored in the vector storage unit 154 at step S1. The vector input and output unit 164 reads the input vector 128 from the vector storage unit 154.

(S7) The vector input and output unit 164 calls the matrix operation unit 167 for each thread. For each thread, the matrix operation unit 167 multiplies the submatrix assigned to the thread by the input vector 128. The vector input and output unit 164 adds all the work vectors included in the work area 127 to the resulting vector 129. Thus obtained resulting vector 129 represents the product of the symmetric sparse matrix and the input vector 128. This parallel matrix operation will be described in detail later.

(S8) The matrix operation requesting unit 161 reads the resulting vector 129 from the vector storage unit 154. Then, the matrix operation requesting unit 161 determines whether an operation status satisfies a specific completion condition or not. If the completion condition is satisfied, the matrix operation requesting unit 161 completes the iterative operation. If not, then the matrix operation requesting unit 161 uses the read resulting vector 129 to generate the next input vector 128, and the process proceeds back to step S6.

Figure 16:
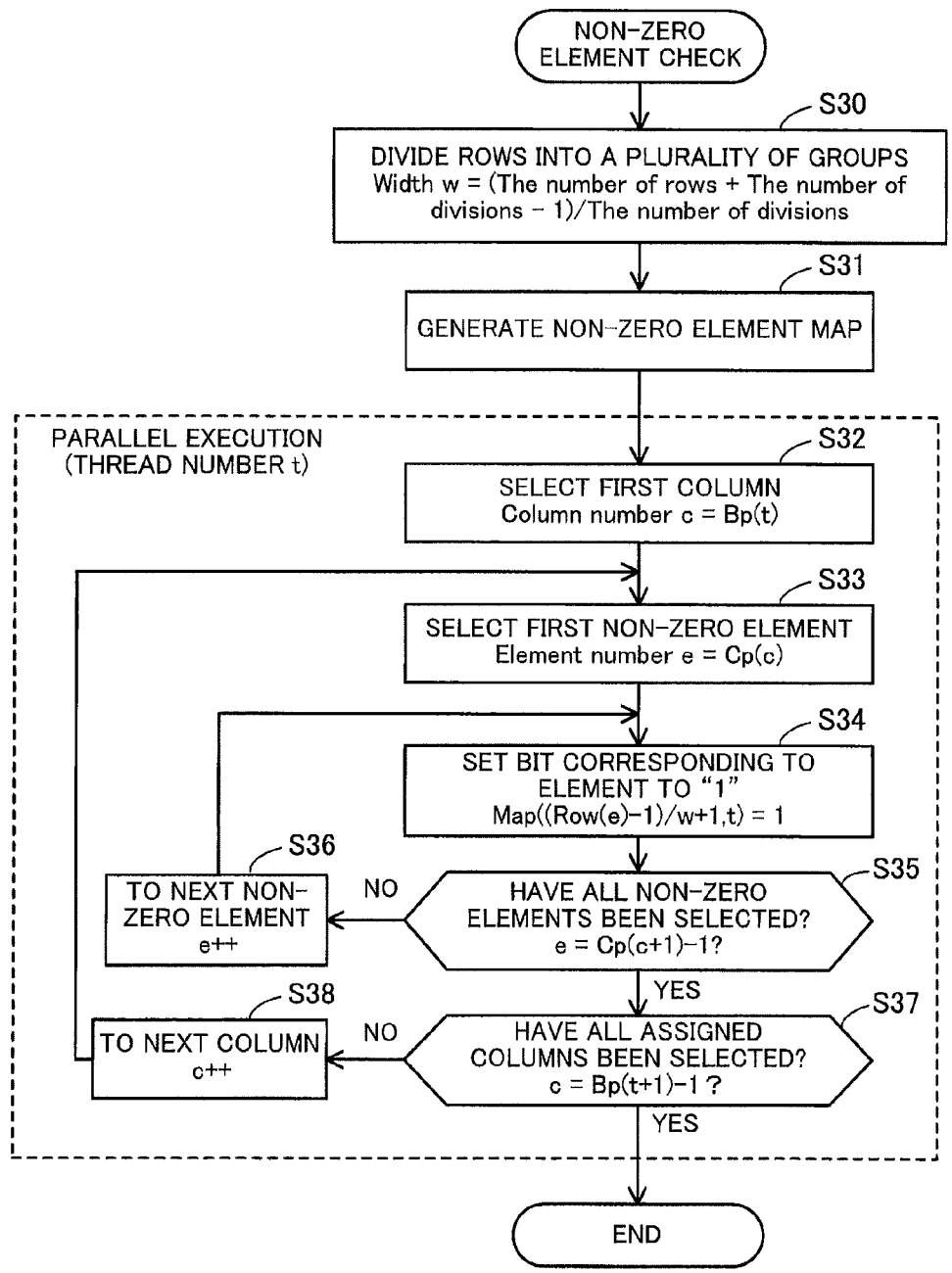
FIG. 16 is a flowchart illustrating how to conduct non-zero element check.

FIG. 16 is a flowchart illustrating how to conduct non-zero element check. This non-zero element check is conducted at step S3 of the flowchart of FIG. 15.

(S30) The matrix analysis unit 163 divides the rows of the symmetric sparse matrix into a plurality of row groups. For example, assuming that the number of groups (the number of divisions) is already determined, the matrix analysis unit 163 calculates the width (the number of rows in one group) using an equation: width w=(the number of rows in symmetric sparse matrix+the number of divisions−1)/the number of divisions. In the following description, decimal values are truncated in the division.

(S31) The matrix analysis unit 163 generates a non-zero element map 125 with as many rows as the number of divisions and as many columns as the number of threads, and stores the non-zero element map 125 in the control data storage unit 152. At this time, the matrix analysis unit 163 initializes all the elements in the non-zero element map 125 to zero. The matrix analysis unit 163 then calls the non-zero element check unit 166 for each thread. Then, the following steps S32 to S38 are executed in parallel by the plurality of threads. The following describes the case where the thread (thread #t) with a thread number of t executes steps S32 to S38.

(S32) The non-zero element check unit 166 selects the first column of the column group assigned to the thread #t with reference to the thread pointer array 124. More specifically, the non-zero element check unit 166 identifies the column number c=Bp(t).

(S33) The non-zero element check unit 166 selects the first non-zero element in the column selected at step S32 or S38, with reference to the column pointer array 123. More specifically, the non-zero element check unit 166 identifies the element number e=Cp(c).

(S34) The non-zero element check unit 166 sets a flag of "1" for the non-zero element selected at step S33 or S36 in the non-zero element map 125. More specifically, the non-zero element check unit 166 sets Map((Row(e)−1)/w+1, t)=1.

(S35) The non-zero element check unit 166 determines with reference to the column pointer array 123 whether all the non-zero elements in the column selected at step S32 or S38 have been selected or not. More specifically, the non-zero element check unit 166 determines whether the element number e identified at step S33 or S36 matches Cp(C+1)−1 or not. If all the elements have been selected, the process proceeds to step S37. If there is any unselected element, then the process proceeds to step S36.

(S36) The non-zero element check unit 166 selects the next non-zero element. More specifically, the non-zero element check unit 166 increments the element number e (adds one to the current element number e). Then, the process proceeds to step S34.

(S37) The non-zero element check unit 166 determines with reference to the thread pointer array 124 whether all the columns assigned to the thread #t have been selected or not. More specifically, the non-zero element check unit 166 determines whether the column number c matches Bp(t+1)−1 or not. If all the columns have been selected, the non-zero element check unit 166 completes the non-zero element check, and notifies the matrix analysis unit 163 of the completion. If there is any unselected column, the process proceeds to step S38.

(S38) The non-zero element check unit 166 selects the next column. More specifically, the non-zero element check unit 166 increments the column number c (add one to the current column number c). Then the process proceeds to step S33.

Figure 17:
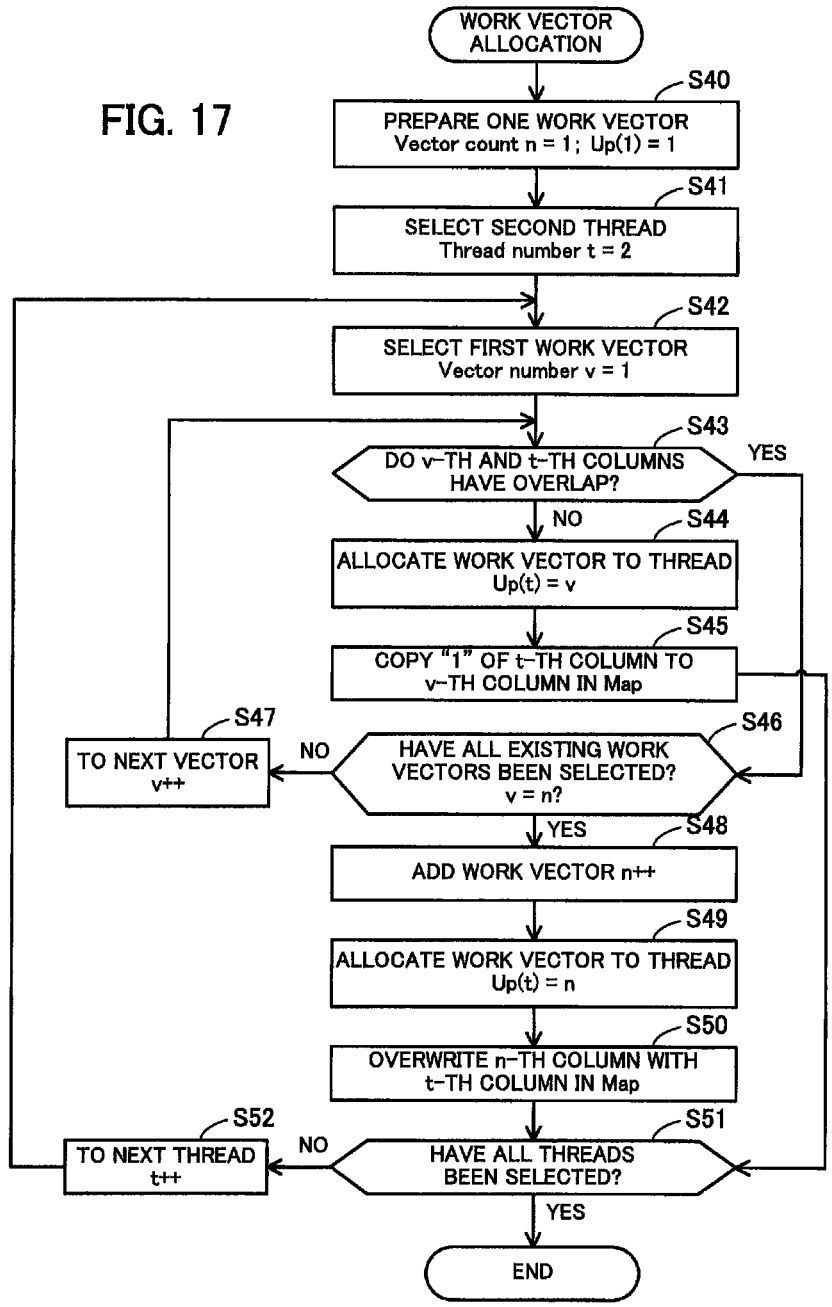
FIG. 17 is a flowchart illustrating how to allocate work vectors.

FIG. 17 is a flowchart illustrating how to allocate work vectors. This allocation of work vectors is performed at step S4 of the flowchart of FIG. 15.

(S40) The matrix analysis unit 163 determines to prepare one work vector, and allocates the prepared work vector to the thread #1. More specifically, the matrix analysis unit 163 sets the vector count n to one as a variable, and sets Up(1)=1.

(S41) The matrix analysis unit 163 selects the thread #2. More specifically, the matrix analysis unit 163 sets the thread number t to two as a variable.

(S42) The matrix analysis unit 163 selects the first one of the currently existing work vectors. More specifically, the matrix analysis unit 163 sets the vector number v to one as a variable.

(S43) The matrix analysis unit 163 compares the v-th column with the t-th column in the non-zero element map 125 to determine whether they overlap in the distribution of flag=1 or not. More specifically, the matrix analysis unit 163 calculates the logical AND of the v-th column vector and the t-th column vector, and determines whether both the v-th column vector and t-th column vector have a flag of "1" in the same row group. If there is an overlap in the distribution of flag=1, the process proceeds to step S46. If not, the process proceeds to step S44.

(S44) The matrix analysis unit 163 allocates the work vector selected at step S42 or S47 to the thread selected at step S41 or S52. More specifically, the matrix analysis unit 163 sets Up(t)=v.

(S45) The matrix analysis unit 163 copies the flag=1 of the t-th column to the v-th column in the non-zero element map 125. Then, the process proceeds to step S51.

(S46) The matrix analysis unit 163 determines whether all the currently existing work vectors have been selected or not. More specifically, the matrix analysis unit 163 determines whether the vector number v matches the vector count n or not. If all the work vectors have been selected, the process proceeds to step S48. If there is any unselected work vector, then the process proceeds to step S47.

(S47) The matrix analysis unit 163 selects the next work vector from the currently existing work vectors. More specifically, the matrix analysis unit 163 increments the vector number v (adds one to the current vector number v). Then, the process proceeds to step S43.

(S48) The matrix analysis unit 163 adds one work vector. More specifically, the matrix analysis unit 163 increments the vector count n (adds one to the current vector count n).

(S49) The matrix analysis unit 163 allocates the work vector newly added at step S48 to the thread selected at step S41 or S52. More specifically, the matrix analysis unit 163 sets Up(t)=n.

(S50) The matrix analysis unit 163 overwrites the flags of the n-th column with the flags of t-th column in the non-zero element map 125. Thereby, the n-th column vector becomes identical to the t-th column vector.

(S51) The matrix analysis unit 163 determines whether all the threads have been selected or not. More specifically, the matrix analysis unit 163 determines whether the thread number t matches the number of threads. If all the threads have been selected, the matrix analysis unit 163 completes the allocation of work vectors. As a result, the number of work vectors to be prepared in the work area 127 and the contents of the work pointer array 126 are fixed. If there is any unselected thread, then the process proceeds to step S52.

(S52) The matrix analysis unit 163 selects the next thread. More specifically, the matrix analysis unit 163 increments the thread number t (adds one to the current thread number t). Then, the process proceeds to step S42.

Figure 18:
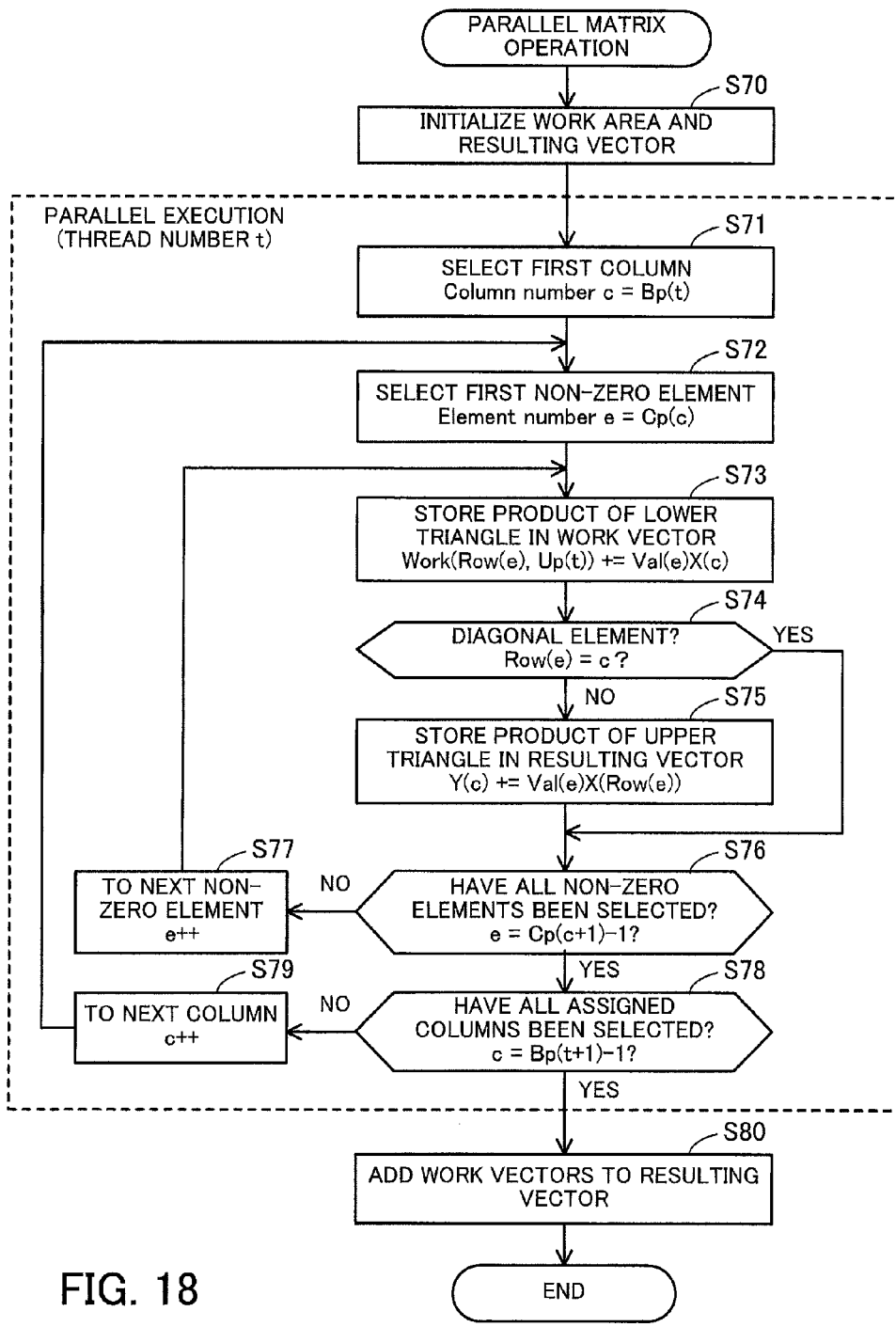
FIG. 18 is a flowchart illustrating how to perform parallel matrix operation.

FIG. 18 is a flowchart illustrating how to perform parallel matrix operation. This parallel matrix operation is performed at step S7 of the flowchart of FIG. 15.

(S70) The vector input and output unit 164 initializes all of the elements of the work vectors in the work area 127 and the elements of the resulting vector 129 to zero. Then, the vector input and output unit 164 calls the matrix operation unit 167 for each thread. Then, the following steps S71 to S79 are executed in parallel by the plurality of threads. The following describes the case where the thread (thread #t) with a thread number of t executes the steps S71 to S79.

(S71) The matrix operation unit 167 selects the first column of the column group assigned to the thread #t with reference to the thread pointer array 124. More specifically, the matrix operation unit 167 identifies the column number c=Bp(t).

(S72) The matrix operation unit 167 selects the first non-zero element included in the column selected at step S71 or S79, with reference to the column pointer array 123. More specifically, the matrix operation unit 167 identifies the element number e=Cp(c).

(S73) With respect to the lower triangle part, the matrix operation unit 167 calculates and stores the product of the value of the non-zero element selected at step S72 or S77 and the value in the c-th row of the input vector 128, in the work vector allocated to the thread #t. More specifically, the matrix operation unit 167 adds Val(e)X(c) to Work(Row(e), Up(t)).

(S74) The matrix operation unit 167 determines whether the non-zero element selected at step S72 or S77 is a diagonal element in the symmetric sparse matrix or not. More specifically, the matrix operation unit 167 determines whether Row (e) matches the column number c or not. If the non-zero element is a diagonal element, the process proceeds to step S76. If not, the process proceeds to step S75.

(S75) With respect to the upper triangle part (excluding diagonal elements), the matrix operation unit 167 calculates and stores the product of the value of the non-zero element selected at step S72 or S77 and the value of the row corresponding to the non-zero element in the input vector 128, in the resulting vector 129. More specifically, the matrix operation unit 167 adds Val(e)X(Row(e)) to Y(c).

(S76) The matrix operation unit 167 determines with reference to the column pointer array 123 whether all the non-zero elements included in the column selected at step S71 or S79 have been selected or not. More specifically, the matrix operation unit 167 determines whether the element number e identified at step S72 or S77 matches Cp(c+1)−1 or not. If all the non-zero elements have been selected, the process proceeds to step S78. If there is any unselected element, then the process proceeds to step S77.

(S77) The matrix operation unit 167 selects the next non-zero element. More specifically, the matrix operation unit 167 increments the element number e. Then, the process proceeds to step S73.

(S78) The matrix operation unit 167 determines with reference to the thread pointer array 124 whether all the columns assigned to the thread #t have been selected or not. More specifically, the matrix operation unit 167 determines whether the column number c matches Bp(t+1)−1 or not. If all the columns have been selected, the matrix operation unit 167 completes the calculation of multiplying the submatrix by the input vector 128, and notifies the vector input and output unit 164 of the completion. Then, the process proceeds to step S80. If there is any unselected column, the process proceeds to step S79.

(S79) The matrix operation unit 167 selects the next column. More specifically, the matrix operation unit 167 increments the column number c. Then, the process proceeds to step S72.

(S80) The vector input and output unit 164 adds all the work vectors included in the work area 127 to the resulting vector 129. More specifically, the vector input and output unit 164 adds the value in row i and column j of the work area 127 to Y(i). Then, the vector input and output unit 164 notifies the matrix operation requesting unit 161 of the completion of the matrix operation.

As described above, the second embodiment describes the case of multiplying a symmetric sparse matrix by a column vector. However, the above method of allocating work vectors may be applied to the case of multiplying a row vector by a symmetric sparse matrix. In this case, the work vectors may be used to store the products of submatrices in the upper triangle part of the symmetric sparse matrix and an input vector 128.

Further, in the second embodiment, the symmetric sparse matrix is represented in the compressed column storage format. However, the symmetric sparse matrix may be represented in the compressed row storage format or may be represented without being compressed. In the case where submatrices at symmetrical positions are assigned to the same thread, there is a problem of access conflict between threads in either one of the upper triangle part and the lower triangle part.

Still further, in the second embodiment, a sparse matrix to be multiplied by a vector is a symmetric matrix. However, a sparse matrix that is not a symmetric matrix may be used. In the case of dividing the columns of the sparse matrix represented in the compressed column storage format and then multiplying the sparse matrix by a column vector, there is a problem of access conflict between threads. Likewise, in the case of dividing the rows of the sparse matrix represented in the compressed row storage format and then multiplying a row vector by the sparse matrix, there is a problem of access conflict between threads.

According to the second embodiment, the information processing apparatus 100 compares the submatrices assigned to a plurality of threads in terms of their distributions of non-zero elements, and allocates a shared work vector to a combination of threads that do not overlap in the distributions of non-zero elements. This prevents access conflict to the same element of the work vector, which eliminates the need of exclusive control for access to the work vector between the plurality of threads. In addition, it is possible to reduce (for example, minimize) the number of work vectors prepared in the work area 127 without causing the access conflict. Therefore, the size of the work area 127 is suppressed even if the number of threads increases. That is to say, the information processing apparatus 100 is able to use the storage area of the RAM 120 efficiently and to multiply a large-scale sparse matrix by a vector efficiently.

As described earlier, the information processing of the first embodiment may be implemented by the information processing apparatus 10 executing a program. In addition, the information processing of the second embodiment may be implemented by the information processing apparatus 100 executing a program.

Such a program may be recorded on a computer-readable recording medium (for example, recording medium 143). For example, as the recording medium, a magnetic disk, optical disk, magneto-optical disk, semiconductor memory, or the like may be used. Magnetic disks include FDs and HDDs. Optical disks include CDs, CD-R (Recordable), CD-RW (Rewritable), DVD, DVD-R, and DVD-RW. The program may be recorded on portable recording media and then distributed. In this case, the program may be copied (installed) from a portable recording medium to another recording medium such as an HDD (for example, HDD 131) and then executed.

According to one aspect, it is possible to efficiently use the storage area of a memory in matrix operation.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing therein a memory allocating program that causes a computer to perform a process comprising:

assigning calculation of a first submatrix included in a matrix to a first thread and calculation of a second submatrix included in the matrix to a second thread, the matrix including zero elements and non-zero elements;

comparing the first and second submatrices as to where in the matrix the non-zero elements of the first submatrix reside and where in the matrix the non-zero elements of the second submatrix reside, the comparing including comparing row positions of the non-zero elements of the first submatrix with row positions of the non-zero elements of the second submatrix, so as to determine whether the first and second submatrices conflict in terms of row positions of the non-zero elements thereof; and allocating at least one shared storage area for storing a single column vector calculated by the first and second threads, when the comparing finds that all the non-zero elements of the first submatrix reside in different rows of the matrix from any non-zero element in the second submatrix, such that the first thread writes first vector elements calculated by using the non-zero elements of the first submatrix into a first portion of the shared storage area, while the second thread writes second vector elements calculated by using the non-zero elements of the second submatrix into a second portion of the shared storage area, without exclusive control between the first and second threads.

2. The non-transitory computer-readable storage medium according to claim 1, wherein:

the matrix is a symmetric matrix; and
the process further includes
  assigning calculation of a third submatrix included in the matrix to the first thread and calculation of a fourth submatrix included in the matrix to the second thread, the third submatrix being at a symmetrical position to the first submatrix, the fourth submatrix being at a symmetrical position to the second submatrix, and
  allocating a shared storage area to be used for the third and fourth submatrices to the first and second threads irrespective of the result of the comparing.

3. The non-transitory computer-readable storage medium according to claim 1, wherein the comparing includes dividing rows or columns of the matrix into a plurality of groups, determining whether a non-zero element exists in each of the groups with respect to each of the first and second submatrices, and comparing, on a group-by-group basis, the first submatrix with the second submatrix in terms of existence or absence of a non-zero element.

4. The non-transitory computer-readable storage medium according to claim 1, wherein the process further includes, when the matrix is represented in a compressed column storage format, extracting a submatrix that does not include overlapping columns with the first submatrix, from the matrix as the second submatrix.

5. A parallel operation method executed by a computer capable of executing a plurality of threads in parallel, the method comprising:
  assigning, by a processor of the computer, calculation of a first submatrix included in a matrix to a first thread and calculation of a second submatrix included in the matrix to a second thread, the matrix including zero elements and non-zero elements;
  comparing, by the processor, the first and second submatrices as to where in the matrix the non-zero elements of the first submatrix reside and where in the matrix the non-zero elements of the second submatrix reside, the comparing including comparing row positions of the non-zero elements of the first submatrix with row positions of the non-zero elements of the second submatrix, so as to determine whether the first and second submatrices conflict in terms of row positions of the non-zero elements thereof; and
  allocating, by the processor, at least one shared storage area for storing a single column vector calculated by the first and second threads, when the comparing finds that all the non-zero elements of the first submatrix reside in different rows of the matrix from any non-zero element in the second submatrix, such that the first thread writes first vector elements calculated by using the non-zero elements of the first submatrix into a first portion of the shared storage area, while the second thread writes second vector elements calculated by using the non-zero elements of the second submatrix into a second portion of the shared storage area, without exclusive control between the first and second threads.

6. An information processing apparatus comprising:
a plurality of processors configured to be capable of executing a plurality of threads in parallel; and
a memory configured to store vectors to be respectively used in calculations by the threads, wherein
one of the plurality of processors is configured to perform a process including:
  assigning calculation of a first submatrix included in a matrix to a first thread and calculation of a second submatrix included in the matrix to a second thread, the matrix including zero elements and non-zero elements;
  comparing the first and second submatrices as to where in the matrix the non-zero elements of the first submatrix reside and where in the matrix the non-zero elements of the second submatrix reside, the comparing including comparing row positions of the non-zero elements of the first submatrix with row positions of the non-zero elements of the second submatrix, so as to determine whether the first and second submatrices conflict in terms of row positions of the non-zero elements thereof; and
  allocating at least one shared storage area in the memory for storing a single column vector calculated by the first and second threads, when the comparing finds that all the non-zero elements of the first submatrix reside in different rows of the matrix from any non-zero element in the second submatrix, such that the first thread writes first vector elements calculated by using the non-zero elements of the first submatrix into a first portion of the shared storage area, while the second thread writes second vector elements calculated by using the non-zero elements of the second submatrix into a second portion of the shared storage area, without exclusive control between the first and second threads.

* * * * *